US007882006B2

(12) United States Patent  (10) Patent No.: US 7,882,006 B2
Gardner et al.  (45) Date of Patent: Feb. 1, 2011

(54) SYSTEM, METHOD, AND COMPUTER PROGRAM PRODUCT FOR SCORING ITEMS BASED ON USER SENTIMENT AND FOR DETERMINING THE PROFICIENCY OF PREDICTORS

(75) Inventors: David Herr Gardner, Alexandria, VA (US); Tracy Randall Sigler, Alexandria, VA (US); Todd Lewis Etter, Alexandria, VA (US); Robert Glenn Etter, Jr., Oakland, CA (US)

(73) Assignee: The Motley Fool, LLC, Alexandria, VA (US)

( * ) Notice: Subject to any disclaimer, the term of this patent is extended or adjusted under 35 U.S.C. 154(b) by 193 days.

(21) Appl. No.: 11/267,179

(22) Filed: Nov. 7, 2005

(65) Prior Publication Data

US 2006/0218179 A1  Sep. 28, 2006

Related U.S. Application Data

(63) Continuation-in-part of application No. 11/088,901, filed on Mar. 25, 2005, now abandoned.

(51) Int. Cl.
*G06Q 40/00* (2006.01)
(52) U.S. Cl. .................................................. 705/36 R
(58) Field of Classification Search ................ 705/36 R
See application file for complete search history.

(56) References Cited

U.S. PATENT DOCUMENTS

| 4,592,546 A | 6/1986 | Fascenda et al. |
|---|---|---|
| 4,695,903 A | 9/1987 | Serap et al. |
| 4,870,579 A | 9/1989 | Hey |
| 5,034,807 A | 7/1991 | Von Kohorn |
| 5,263,723 A | 11/1993 | Pearson et al. |
| 5,502,637 A | 3/1996 | Beaulieu et al. |
| 5,608,620 A | 3/1997 | Lundgren |
| 5,759,101 A | 6/1998 | Von Kohorn |

(Continued)

FOREIGN PATENT DOCUMENTS

EP  0 643 359 A2  3/1995

(Continued)

OTHER PUBLICATIONS

Heskes, T.M. et al., Practical confidence and prediction intervals for prediction tasks, "Proceedings of Neural Networks." Best Practices in Europe, pp. 128-135, May 22, 1997.*

(Continued)

*Primary Examiner*—Olabode Akintola
(74) *Attorney, Agent, or Firm*—Sterne Kessler Goldstein & Fox PLLC

(57) ABSTRACT

The present invention provides systems, methods, computer program products, and combinations and subcombinations thereof for scoring items based on user sentiment and for determining the proficiency of a predictor and for aiding an investment decision on an item by an individual. The invention includes one or more user devices and a prediction system server having a sentiment rating module, a user proficiency ranking module, a content creation module, and a database. Devices access the prediction system server directly via a communications medium or indirectly through links provided on a third party server.

8 Claims, 22 Drawing Sheets

U.S. PATENT DOCUMENTS

| | | | |
|---|---|---|---|
| 5,813,913 | A | 9/1998 | Berner et al. |
| 5,825,883 | A | 10/1998 | Archibald et al. |
| 5,848,396 | A | 12/1998 | Gerace |
| 6,041,316 | A | 3/2000 | Allen |
| 6,049,777 | A | 4/2000 | Sheena et al. |
| 6,064,980 | A | 5/2000 | Jacobi et al. |
| 6,092,049 | A | 7/2000 | Chislenko et al. |
| 6,131,085 | A | 10/2000 | Rossides |
| 6,135,881 | A | 10/2000 | Abbott et al. |
| 6,249,770 | B1 | 6/2001 | Erwin et al. |
| 6,260,019 | B1* | 7/2001 | Courts ............................ 705/1 |
| 6,287,199 | B1 | 9/2001 | McKeown et al. |
| 6,293,868 | B1 | 9/2001 | Bernard |
| 6,370,516 | B1 | 4/2002 | Reese |
| 6,434,550 | B1 | 8/2002 | Warner et al. |
| 6,443,840 | B2 | 9/2002 | Von Kohorn |
| 6,453,303 | B1 | 9/2002 | Li |
| 6,473,084 | B1 | 10/2002 | Phillips et al. |
| 6,487,541 | B1 | 11/2002 | Aggarwal et al. |
| 6,510,419 | B1 | 1/2003 | Gatto |
| 6,636,836 | B1 | 10/2003 | Pyo |
| 6,681,211 | B1 | 1/2004 | Gatto |
| 6,773,350 | B2 | 8/2004 | Yoshimi et al. |
| 6,792,399 | B1 | 9/2004 | Phillips et al. |
| 6,810,394 | B2 | 10/2004 | Coutts et al. |
| 6,831,663 | B2 | 12/2004 | Chickering et al. |
| 6,895,385 | B1 | 5/2005 | Zacharia et al. |
| 6,970,839 | B2 | 11/2005 | Jakobsson |
| 6,983,257 | B2 | 1/2006 | Gatto |
| 6,985,867 | B1 | 1/2006 | Pryor et al. |
| 7,016,872 | B1* | 3/2006 | Bettis et al. ............... 705/36 R |
| 7,155,510 | B1* | 12/2006 | Kaplan ....................... 709/224 |
| 2001/0034730 | A1* | 10/2001 | Bhandari et al. ............... 707/7 |
| 2001/0042037 | A1 | 11/2001 | Kam et al. |
| 2002/0002520 | A1 | 1/2002 | Gatto |
| 2002/0022988 | A1* | 2/2002 | Columbus et al. ............. 705/11 |
| 2002/0052820 | A1 | 5/2002 | Gatto |
| 2002/0095305 | A1 | 7/2002 | Gakidis et al. |
| 2002/0115489 | A1 | 8/2002 | Jordan et al. |
| 2002/0120619 | A1 | 8/2002 | Marso et al. |
| 2002/0133447 | A1 | 9/2002 | Mastman |
| 2002/0152288 | A1 | 10/2002 | Hora et al. |
| 2002/0184131 | A1 | 12/2002 | Gatto |
| 2002/0198866 | A1 | 12/2002 | Kraft et al. |
| 2002/0199194 | A1 | 12/2002 | Ali |
| 2003/0028563 | A1 | 2/2003 | Stutz et al. |
| 2003/0065601 | A1 | 4/2003 | Gatto |
| 2003/0093353 | A1 | 5/2003 | Ward et al. |
| 2003/0110124 | A1 | 6/2003 | Esher |
| 2003/0187721 | A1 | 10/2003 | Etoh et al. |
| 2003/0187771 | A1 | 10/2003 | Bulan |
| 2003/0191737 | A1 | 10/2003 | Steele et al. |
| 2004/0034652 | A1 | 2/2004 | Homann et al. |
| 2004/0111353 | A1 | 6/2004 | Ellis et al. |
| 2004/0133497 | A1 | 7/2004 | Spear |
| 2004/0143533 | A1 | 7/2004 | Preist et al. |
| 2005/0021390 | A1 | 1/2005 | Porter et al. |
| 2005/0080695 | A1 | 4/2005 | Gatto |
| 2005/0091245 | A1 | 4/2005 | Chickering et al. |
| 2005/0125307 | A1 | 6/2005 | Hunt et al. |
| 2005/0131897 | A1 | 6/2005 | Grasso et al. |
| 2005/0177419 | A1* | 8/2005 | Choi et al. .................... 705/14 |
| 2006/0074785 | A1 | 4/2006 | Festog et al. |
| 2006/0080212 | A1 | 4/2006 | Anderson et al. |
| 2006/0085247 | A1 | 4/2006 | Gatto et al. |
| 2008/0133417 | A1 | 6/2008 | Robinson |

FOREIGN PATENT DOCUMENTS

| | | |
|---|---|---|
| EP | 0 751 471 A1 | 1/1997 |
| WO | WO 95/29451 A1 | 11/1995 |
| WO | WO 96/15505 A2 | 5/1996 |
| WO | WO 96/25709 A1 | 8/1996 |
| WO | WO 97/44741 A1 | 11/1997 |
| WO | WO 98/33135 A1 | 7/1998 |
| WO | WO 01/02985 A2 | 1/2001 |
| WO | WO 01/86532 A1 | 11/2001 |

OTHER PUBLICATIONS

Hoch, S.J., "Who Do We Know: Predicting the Interests and Opinions of the American Consumer," Journal of Consumer Research, vol. 15, pp. 315-324, 1998.*

Falk, H. et al., "Retailing and online consumer information services (OLCISs)," *International Journal of Retail & Distribution Management*, vol. 22, Iss. 7, p. 18, 6 pages, 1994 (downloaded Mar. 13, 2006 from http://proquest.uni.com, 7 pages).

Kollock, P., "The Production of Trust in Online Markets," *Advances in Group Processes*, vol. 16, 1999 (downloaded Mar. 13, 2006 from http://www.sscnet.ucla.edu, 21 pages).

Nichols, D.M., "Implicit Rating and Filtering," *5th DELOS Workshop Filtering and Collaborative Filtering*, Budapest, 6 pages, Nov. 10-12, 1987.

Mulvenna, M. et al., "The 'Soft-Push': Mining Internet Data for Marketing Intelligence," *Proceedings of the Working Conference on Electronic Commerce in the Framework of Mediterranean Countries Development*, pp. 333-349, 1997.

Hoch, S.J., "Who Do We Know: Predicting the Interests and Opinions of the American Consumer," *Journal of Consumer Research*, vol. 15, pp. 315-324, 1998.

Jones, D.H. and Navin-Chandra, D., "IndustryNet: A Model for Commerce on the World Wide Web," *IEEE Expert*, pp. 54-59, Oct. 1995.

Walter, M., "The State of Web, Publishing, 1998: Leveraging the Brand in the Professional Market." *Seybold Report on Internet Publishing*, vol. 2, No. 12, p. 15(1), Aug. 1998 (downloaded from Dialog® File 275: Gale Group Computer DB™, 3 pages).

Johnson, S.J., "Retail systems: no longer business as usual." *Journal of Systems Management*, vol. 43, No. 8, p. 8(5), Aug. 1992 (downloaded from Dialog® File 275: Gale Group Computer DB™, 10 pages).

Diefenbacher, B., "The time to plan for e-business is now." *MIDRANGE Systems*, vol. 11, No. 1, p. 54(1), Jan. 19, 1998 (downloaded from Dialog® File 275: Gale Group Computer DB™, 3 pages).

Turksen, B., "A fuzzy set model for market share and preference prediction," *European Journal of Operational Research*, vol. 82, No. 1, pp. 39-52, Apr. 6, 1995.

Elliot, M. et al., "Focus on consumer 'Hot buttons' (banking customer priorities and values)." *Bank Management*, vol. 71, No. 5, pp. 70-73, Sep.-Oct. 1995.

Heskes, T.M. et al., "Practical confidence and prediction intervals for prediction tasks," *Proceedings of Neural Networks: Best Practices in Europe*, pp. 128-135, May 22, 1997.

Rao, T.R., "An interactional model of market behaviour: computer simulation," *Bulletin of the Institute of Management Sciences*, vol. 1, No. 5, pp. 67-68, 1971.

Zufryden, F.S., "A composite heterogeneous model of brand choice and purchase timing behavior," *Management Science*, vol. 24, No. 2, pp. 121-136, Oct. 1977.

Blin, J-M., "The relationship between attributes, brand preference and choice: a stochastic view," *Management Science*, vol. 26, No. 6, pp. 606-619, Jun. 1980.

Ambler, T., "How much of brand equity is explained by trust?" *Management Decision*, vol. 34, Issue 4, p. 283, 1997 (downloaded Mar. 13, 2006 from http://proquest.umi.com, 13 pages).

Lichtenstein, D.R. et al., "Price Perceptions and Consumer Shopping Behavior: A Field Study," *Journal of Marketing Research*, vol. XXX, pp. 234-245, May 1993.

Trappey, C.V. et al., "Knowledge base system for predicting merchandise investment returns," *Applied Artificial Intelligence*, vol. 7, No. 3, pp. 207-221, Jul.-Sep. 1993.

Bucklin, R.E. et al., "Modelling the effect of purchase quantity on consumer choice of product assortment," *Journal of Forecasting*, vol. 17, No. 3-4, pp. 281-301, Jun.-Jul. 1998.

Jenny Anderson, "ThinkEquity starts a Web log to talk about investing and gather ideas," nytimes.com (http://www.nytimes.com/2005/02/17technology/17place.html?ei=5070&en=89c70af490ct..) Feb. 17, 2005).

International Search Report for International Application No. PCT/US06/01235, filed Jan. 13, 2006, 2 pages.

Non-Final Office Action and References Cited dated Mar. 11, 2009, issued in U.S. Appl. No. 11/522,933, filed Sep. 19, 2006, 8 pgs.

iexchange.com web site, 4 pages, archived Jan. 19, 2001 by archive.org.

PredictWallStreet.com web site, 10 pages, archived Jan. 25, 2002 by archive.org.

* cited by examiner

Rate This Stock — 602A

I predict that Stock A will [outperform / underperform] (624a) the S&P 500 in the next [week / month / year / 2-4 years / unspecified] (626a)

Rate This Player — 602B

I predict that Player B will rush for [over / under] (624b) 75 yards in Game X. (626b)

Rate This Award Category — 602C

I predict [Actress A / Actress B / Actress C / Actress D] (624c) will win "Best Actress" at the 2006 Academy Awards. (626c)

Rate This Election — 602D

Candidate C will win [Under 100 electoral votes / Between 100 and 150 electoral votes / Between 150 and 270 electoral votes / Over 270 electoral votes] (624d) in the 2008 presidential election (626d)

Stock Rating League #1

| Player Rating | Player |
|---|---|
| 100 | TMFGoogly |
| 98 | TMFOtter |
| 80 | TMFBreakerCharly |
| 75 | TMFBreakerRick |
| 60 | TMFBreakerDave |
| 55 | TMFLucky11 |
| 40 | TMFShanaBanana |
| 35 | TMFMmbop |
| 20 | TMFSteve |
| 10 | TMFJmk32 |

FIG. 18

| Player Rating | Player | Date | Rated Price | Call | Duration | Change | S&P Change | Score | Pitch |
|---|---|---|---|---|---|---|---|---|---|
| 99 | TMFLucky11 | 04/07/2005 | $192.88 | Outperform | year or so | +60.59% | +4.56% | +56.02 | |
| 98 | TMFBreakerDave | 06/30/2005 | $294.29 | Underperform | year or so | +5.25% | +3.39% | -1.86 | ☺ ! |

TMFBreakerDave posted on 6/30/2005 3:56:00 AM REPLY | MARK AS HELPFUL | REPORT THIS POST ■ is ultimately premised on the idea of great search algorithms leading you to good results, and selling advertising around that. I know it's much more than that, but nevertheless that is ■ and its promise, at the essence.

Here's how they'll be disrupted: structured data. Through ■ and other examples, the DATA and information packaged by NON-search sites is only going to improve. ■ improving its search algorithms will never yield as much benefits for an inquiring public as sites improving their offerings. And magnet sites ■ will wind up structuring and improving on their data offerings, rendering the effectiveness and usefulness of ■ as a little LESS relevant than ■ seems today... kinda like what happened to the Yellow Pages. (Remember those?)

This is an oversimplification. And it isn't going to cause ■ to go down overnight. But the risk/reward at present for a company capitalized already at $80 billion is not attractive to me.

TMFBreakerDave posted on 7/8/2005 4:46:00 PM REPLY | MARK AS HELPFUL | REPORT THIS POST I really do think ■ ends up undercutting some significant portions of ■ business. ■ is a serious Rule Breaker, even though it's a private not-for-profit free site.

TMFLaw posted on 7/28/2005 12:47:00 PM REPLY | MARK AS HELPFUL | REPORT THIS POST This to show how a reply works.

TMFBreakerCharly posted on 8/18/2005 1:53:00 PM REPLY | MARK AS HELPFUL | REPORT THIS POST To play devil's advocate the structured data/magnet sites need to have crystal clear navigation so that users can easily and intuitively find the information they are looking for. Easier said than done, especially as the content contained explodes.

FIG. 23

SYSTEM, METHOD, AND COMPUTER PROGRAM PRODUCT FOR SCORING ITEMS BASED ON USER SENTIMENT AND FOR DETERMINING THE PROFICIENCY OF PREDICTORS

CROSS REFERENCE TO RELATED APPLICATIONS

This application is a continuation-in-part of application Ser. No. 11/088,901 filed on Mar. 25, 2005, which is herein incorporated by reference in its entirety.

FIELD OF THE INVENTION

This invention relates generally to prediction systems, and more particularly to scoring items based on user sentiment and for determining the proficiency of predictors.

BACKGROUND

Individuals often use opinions, comments, and/or predictions of others as a basis for making a variety of decisions. For example, an individual may use the opinion of a pundit or an institution to make a decision on voting or financial instruments in which to invest. These opinions, comments, and predictions are typically not tied to any objective, measurable criteria. Therefore, an individual has very little information available to determine the reliability of an opinion, comment, or prediction.

What is therefore needed is a method, system, and computer program product to gather and apply the sentiment of a community of users to an item.

What is further needed is a method, system, and computer program product to determine the proficiency of individuals making predictions and/or subjective commentary on an item.

BRIEF SUMMARY OF THE INVENTION

Briefly stated, the present invention is directed to systems, methods, computer program products, and combinations and subcombinations thereof for scoring items based on user sentiment and for determining the proficiency of a predictor and for aiding an investment decision on an item by an individual.

These and other advantages and features will become readily apparent in view of the following detailed description of the invention. Note that the Summary and Abstract sections may set forth one or more, but not all exemplary embodiments of the present invention as contemplated by the inventor(s).

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 6A-6D illustrate exemplary predictions associated with certain items, according to embodiments of the present invention.

FIG. 18 is an example community intelligence screen shot displayed on a client, according to embodiments of the present invention.

FIG. 23 is an example of a subjective commentary interface associated with the prediction for an item displayed on a client, according to embodiments of the present invention.

Figure 1:
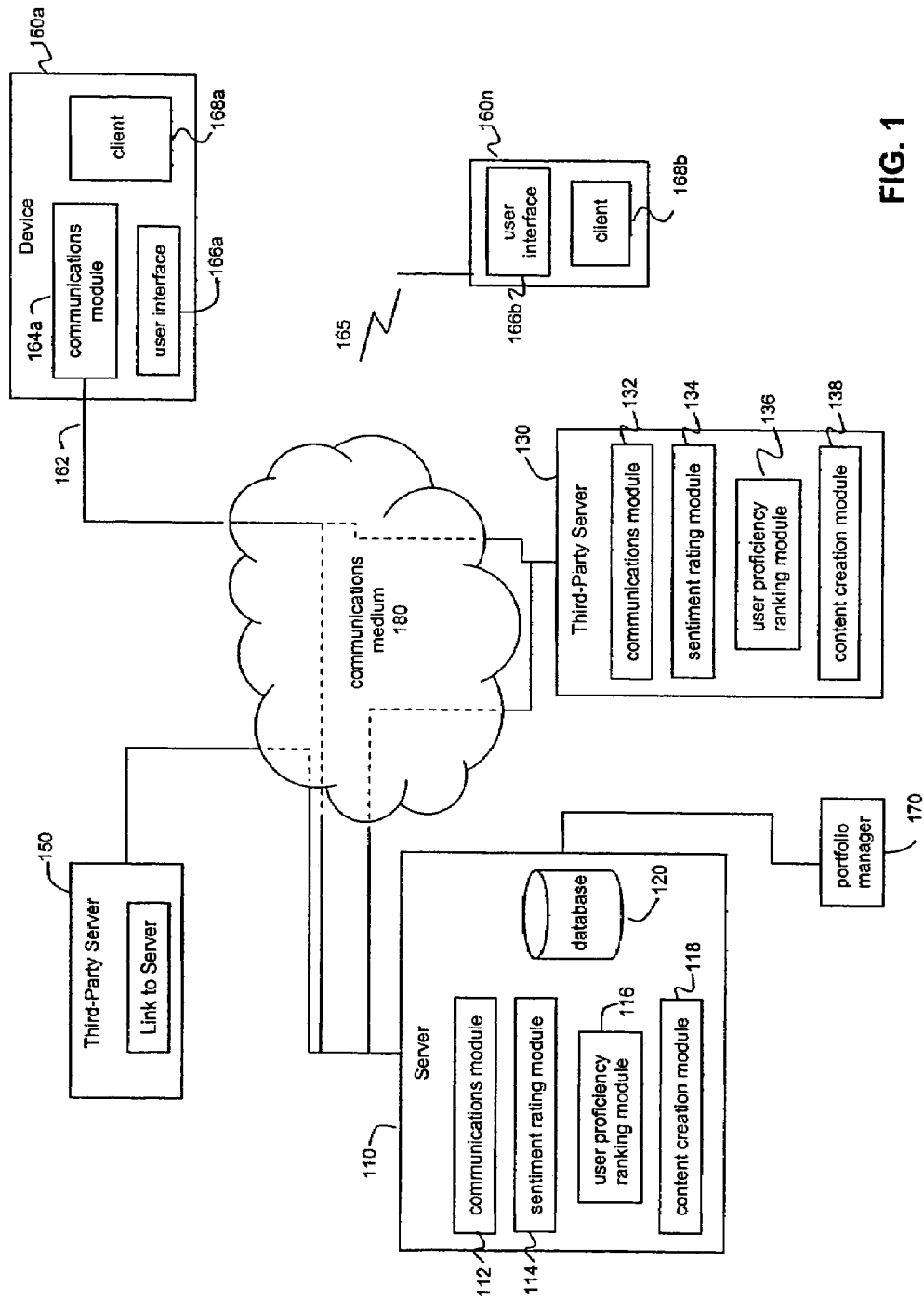
FIG. 1 is a block diagram of an exemplary operating environment, according to an embodiment of the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

Table of Contents

1. Structural Embodiments of the Present Invention
1.1 Example Implementation Embodiments
2. Operational Embodiments of the Present Invention
2.1 Method for Determining Item Scoring Based on User Sentiment
2.2 Method for Determining the Proficiency of a Predictor
   2.2.1 Method for Determining Application of a Contest Entry
   2.2.2 Method for Providing a Gumball
2.3 Methods for Providing Subjective Commentary on an Item
   2.3.1 Method for Providing Commentary Threads Associated with an Item
   2.3.2 Method for Providing Brief Informational Tags Associated with an Item
   2.3.3 Method for Providing Subjective Commentary Supporting a Prediction
2.4 Methods for Sorting Items
3. User Interaction
3.1 Competition among Users
3.2 Aid to Investing
   3.2.1 Prediction Information Associated with Individual Stocks
   3.2.2 Prediction Information Associated with Top Performers
   3.2.3 Reports
   3.2.4 Pundit Ranking
   3.2.5 Tracking Proficiency of Professionals
   3.2.6 Portfolio Tracking
3.3 Creation of Ancillary Content
   3.3.1 Publications
   3.3.2 Ancillary Content Provided by Top Performers
   3.3.3 Algorithm-based Financial Products
3.4 Individual Corporate Use
4. Example User Interface Screen Shots
5. Conclusion

1. STRUCTURAL EMBODIMENTS OF THE PRESENT INVENTION

FIG. 1 is a block diagram of an exemplary operating environment 100 for the system for scoring an item based on user sentiment and for determining the proficiency of predictors, according to an embodiment of the invention. Exemplary operating environment 100 includes a server 110, a third-party server 130, a third-party server 150, one or more devices 160a-n, and a communications medium 180. Although only one server 110, one third-party server 130, and one third-party server 150 are shown, in practice the operating environment may include a plurality of servers 110, a plurality of third-party servers 130, and/or a plurality of third-party servers 150.

In an embodiment, devices 160a-n directly access server 110 via a communications medium 180. Communications medium 180 may be a public data communications network such as the Internet, a private data communications network, the Public Switched Telephone Network (PSTN), a wireless communications network, or any combination thereof. The interface between devices 160a-n can be a wireless interface 165 or a wired interface 162.

Alternatively or additionally, devices 160a-n indirectly access server 110 via a link provided by third party server 150. In this embodiment, a user device accesses a web page provided by the third party server. The web page provides a link to a web site provided by server 110.

Alternatively or additionally, third party server 130 includes some or all of the functionality of server 110. Devices 160a-n directly access third-party server 130 via a communications medium 180. Note that devices 160a-n can also access third party server 130 via a link provided by another server.

Server 110 includes a communications module 112, a sentiment rating module 114, a user proficiency ranking module 116, a content creation module 118, and a database 120. Server 110 is referred to herein as the "prediction system." Other embodiments of server 110 may include a subset of these modules, and/or may include additional modules.

Sentiment rating module 114 performs functions associated with the determination of a community sentiment score for a plurality of items. A community sentiment score is determined by gathering prediction intelligence from a plurality of individuals making a prediction for an item. The community sentiment score represents the number of users who predicted a specific outcome associated with an item. For example, the sentiment rating module 114 may perform calculation of individual sentiment rating components associated with each prediction for an item. The sentiment rating module 114 may also perform the determination of the user sentiment score based on the summation of all individual components and the total number of predictions made for the item.

User proficiency module 116 performs functions associated with the determination of the proficiency of a predictor within a contest of the prediction system. For example, the user proficiency module 116 may perform the function of calculating a prediction score for each prediction based on the prediction information and an objective baseline. The user proficiency module 116 may also perform the function of determining a proficiency score for a user based on the prediction scores for predictions made by the user. In an addition, the proficiency module 116 may also perform the function of ranking users of the prediction system based on proficiency scores.

Content creation module 118 performs functions associated with the creation of content from intelligence gathered by the prediction system. For example, content creation module 118 may perform the function of gathering information on predictions and calculations made by the prediction system. Content creation module 118 may also perform the function of analyzing the gathered intelligence. In addition, content creation module 118 may also perform the function of generating content for informational messages (also referred to as gumballs), publications, reports, blogs, and discussion boards, among other types of content.

Database 120 stores information gathered by and used by the prediction system. For example, database 120 may store a profile for each user. The user profile may include statistical information associated with the user (e.g., user's proficiency score and rank), a listing of all the predictions made by the user, and historical performance data associated with the user. The database may also store information associated with a plurality of items. Item information includes a current community sentiment score for the item, a listing of predictions made for the item, subjective commentary made about the item, brief informational tags (referred to as "flavor tags") associated with the item, and scuttlebutt information on the item. As would be appreciated by person of skill in the art, database 120 can store any information required by the prediction system.

Communications module 112 enables communication between server 110 and entities external to the server 110, such as clients 106, third party servers 130 and 150, and portfolio manager 170. Server 110 communicates with these entities via communication medium 180, which may be any type of wireless or wired communication using any protocol. It is noted that multiple communications modules 112 may execute in a single server 110. For example, in one embodiment, communications module 112 is a TCP/IP stack. In another embodiment, communications module 112 is a secure socket layer stack or a compression stack. As would be appreciated by persons of skill in the art, other implementations for communications module 112 can be used with the present invention.

Third party server 130 includes a communications module 132, a sentiment rating module 134, a user proficiency module 136, and a content creation module 138. These modules are described above in the discussion of server 110. As can be seen in FIG. 1, third party server 130 includes the functionality of a prediction system. In an embodiment, third party server 130 shares intelligence gathered by one or more modules 134-138 with server 110.

Exemplary operation environment 100 also includes one or more portfolio managers 170. A portfolio manager 170 stores a listing of one or more financial assets included in an individual's investment portfolio. In an embodiment, portfolio manager 170 uploads a listing of financial assets in an individual portfolio via communications medium 180 or via a storage device (e.g., CD, DVD, tape, etc.).

Devices 160 include a communication module 164, a user interface 166, and a client 168. Devices 160 may be any type of wired or wireless communication device including, but not limited to, a computer, a lap top, a personal digital assistant (PDA), a wireless telephone, a wired telephone, and televisions.

In embodiments of the present invention, devices 160 include software, hardware, and/or combinations thereof related to client functionality. When a device 160 includes such software, hardware, and/or combinations thereof, the device 160 is referred to herein as a client 168. Accordingly, it can be said that the operating environment 100 includes one or more clients 168.

User interface 166 is preferably a graphical user interface that enables users to interact with clients 168 and functions provided by the client 168. More generally, user interface 166 controls how functions presented by client 168 are presented to users. The user interface 166 controls how users interact with such functions and modules.

Communications module 164 enables client 168 to interact with external entities, such as server 110, and third party servers 130 and 150. In embodiments, communications module 164 enables TCP/IP traffic, although the invention is not limited to this example. More generally, communications module 164 enables communication over any type of communications medium 180, such as wireless or wired and using any communications protocol.

1.1 Example Implementation Embodiments

Figure 2:
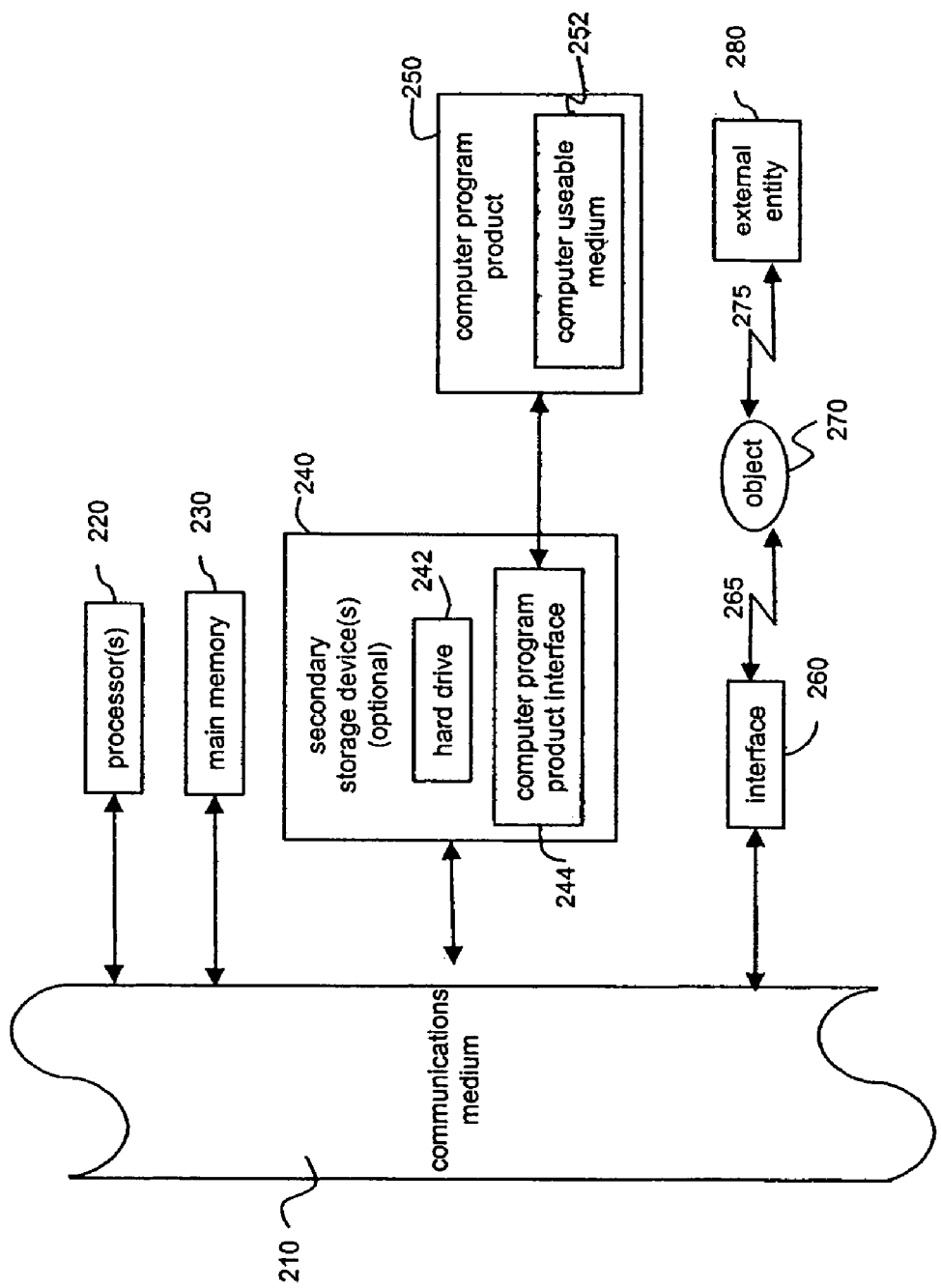
FIG. 2 illustrates a block diagram of a data processing unit that can be used to implement the entities shown in FIG. 1, according to an embodiment of the present invention.

FIG. 2 illustrates a block diagram of a data processing unit 203 that can be used to implement the entities shown in FIG. 1. It is noted that the entities shown in FIG. 1 may be implemented using any number of data processing units 203, and the configuration actually used is implementation specific.

Data processing unit 203 may represent a computer, a hand-held computer, a lap top computer, a personal digital assistant, a mobile phone, and/or any other type of data processing device. The type of data processing device used to implement the entities shown in FIG. 1 is implementation specific.

Data processing unit 203 includes a communications medium 210 (such as a bus, for example) to which other modules are attached.

Data processing unit 203 also includes one or more processors 220 and a main memory 230. Main memory 230 may be RAM, ROM, or any other memory type, or combinations thereof.

Data processing unit 203 may also include secondary storage devices 240 such as but not limited to hard drives 242 or computer program product interfaces 244. Computer program product interfaces 244 are devices that access objects (such as information and/or software) stored in computer program products 250. Examples of computer program product interfaces 244 include, but are not limited to, floppy drives, CD drives, DVD drives, ZIP drives, JAZ drives, optical storage devices, etc. Examples of computer program products 250 include, but are not limited to, floppy disks, CDs, DVDs, ZIP and JAZ disks, memory sticks, memory cards, or any other medium on which objects may be stored.

The computer program products 250 include a computer useable medium 252 on which objects may be stored, such as but not limited to optical mediums, magnetic mediums, etc.

Control logic or software may be stored in main memory 230, second storage device(s) 240, and/or computer program products 250.

More generally, the term "computer program product" refers to any device in which control logic (software) is stored, so in this context a computer program product could be any memory device having control logic stored therein. The invention is directed to computer program products having stored therein software that enables a computer/processor to perform functions of the invention as described herein.

The data processing unit 203 may also include an interface 260 which may receive objects (such as data, applications, software, images, etc.) from external entities 280 via any communications media including wired and wireless communications media. In such cases, objects 270 are transported between external entities 280 and interface 260 via signals 265, 275. In other words, signals 265, 275 include or represent control logic for enabling a processor or computer to perform the functions of the invention. According to embodiments of the invention, such signals 265, 275 are also considered to be computer program products, and the invention is directed to such computer program products.

2. OPERATIONAL EMBODIMENTS OF THE PRESENT INVENTION

2.1 Method for Determining Item Scoring Based on User Sentiment

Figure 3:
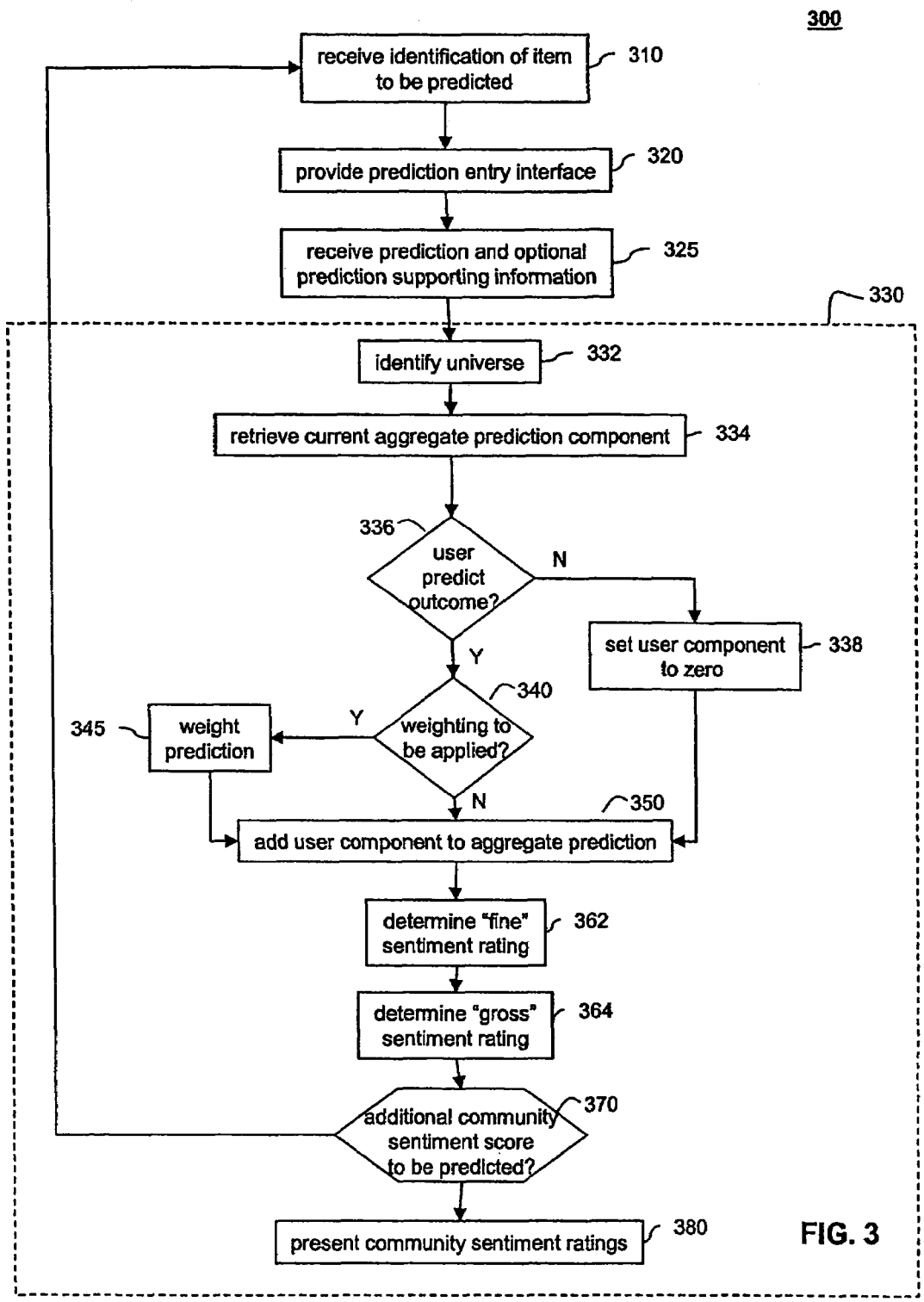
FIG. 3 depicts a flowchart of a method for determining an objective item rating based on user sentiment, according to an embodiment of the present invention.

FIG. 3 depicts a flowchart 300 of a method for determining a score for an item based on community user sentiment, according to an embodiment of the present invention. The score for an item is derived from predictions made by a plurality of users about the performance of the item. Thus, the method of flowchart 300 provides a mechanism for objectively measuring the intelligence of a group of users regarding the performance of an item.

Flowchart 300 will be described with continued reference to the example system architecture 100 described with reference to FIG. 1. However, the invention is not limited to those embodiments. Note that some steps shown in flowchart 300 do not necessarily have to occur in the order shown.

Figure 4:
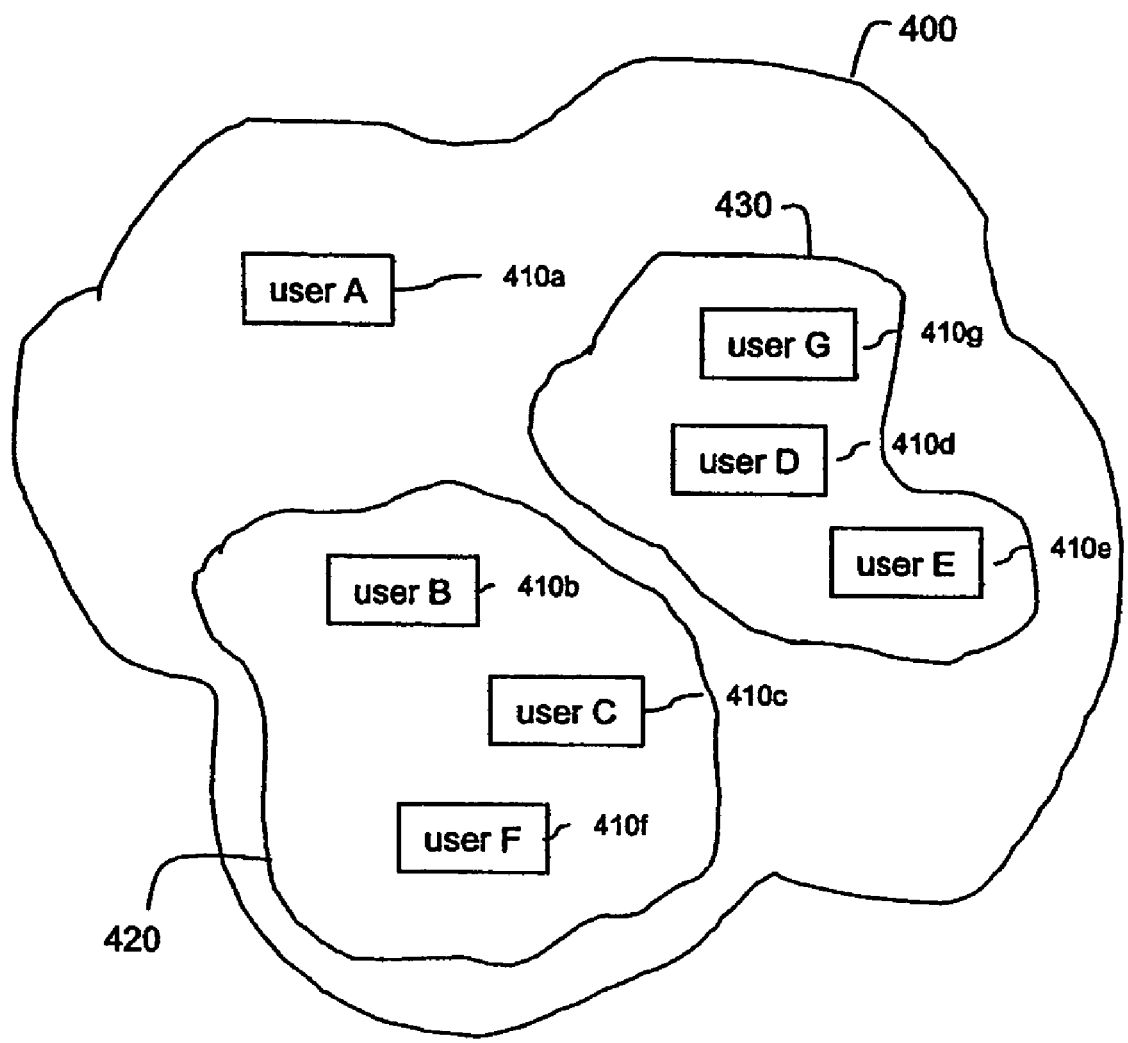
FIG. 4 depicts exemplary communities (universes) in a prediction system.

User sentiment is a reflection of the viewpoint of a set of users in a predefined universe regarding a particular item. In an embodiment, a universe includes all users of the prediction system. Additionally or alternatively, a universe is a sub-set of all users. FIG. 4 depicts a prediction system having a plurality of universes. Universe 400 includes all users 410a-n. Universe 420 includes users 410b, 410c, and 410f and universe 430 includes users 410d, 410e, and 410g.

Flowchart 300 beings in step 310 when the identification of an item to be predicted is received. An item is anything that is associated with objective, measurable criteria or events. For example, an item can be an individual stock, an athletic team (e.g., Philadelphia Eagles), an individual player, a sporting event (e.g., Rose Bowl), a movie, an award nominee, a candidate in an election, game of luck, the weather, etc. As would be appreciated by persons of skill in the art, other types of items can be used with the present invention.

In an embodiment, the prediction system provider selects a set of items that can be predicted by user. An item may need to meet certain criteria to be included in the set of items available for prediction. In an example embodiment of a stock prediction system, a stock must have more than a predetermined price (e.g., greater than $1.00) and be traded on a specific market to be selected as an item for prediction on the system.

In an embodiment, a user identifies an item by entering the item's name in an entry box on an interface provided by the prediction system. In addition or alternatively, a selectable listing of items available for prediction could be provided to the user. As would be appreciated by a person of skill in the art, other methods for identifying an item could be used with the present invention.

In step 320, a prediction entry interface is provided. In an embodiment, the identification of the item in Step 310 causes the item's page to be displayed. The item's display page includes a prediction entry interface. Alternatively, the identification of the item causes the prediction entry interface to be provided as a window or interface on the current page.

Figure 5:
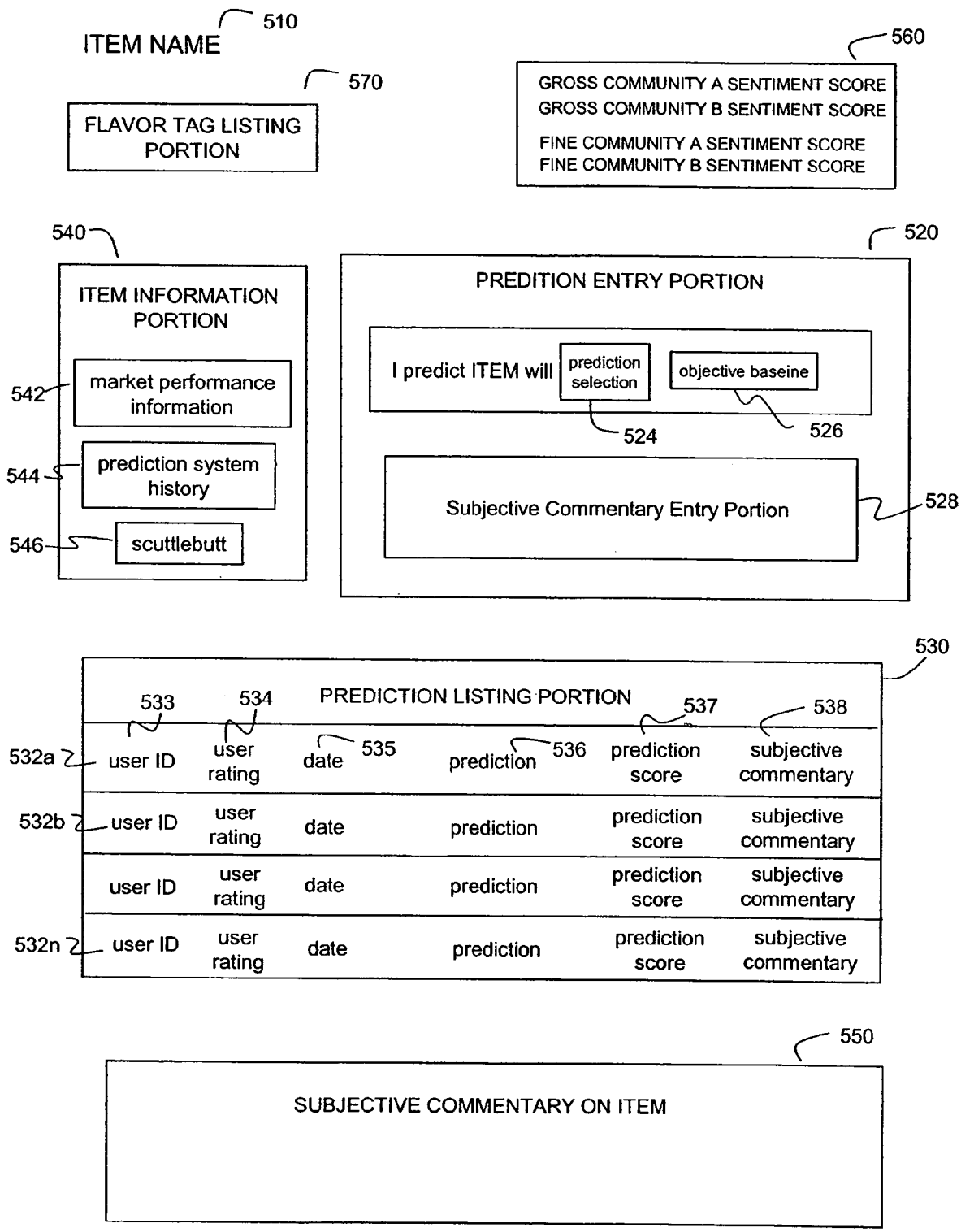
FIG. 5 depicts an exemplary item display page, according to an embodiment of the present invention.

FIG. 5 depicts an exemplary item display page 500, according to an embodiment of the present invention. An item display page 500 includes the item name 510, a prediction entry portion 520, a prediction listing portion 530, an information portion 540, a subjective item commentary portion 550, a community sentiment score portion 560, and a flavor tag listing portion 570.

The prediction entry portion 520 includes prediction information section 522 and an interface for entering subjective supporting information 528. The prediction entry portion 522 includes the item, an objective baseline 526, and a prediction selection mechanism 524.

The objective baseline 526 provides an objective measure against which the prediction will be compared. For example, if a stock is the item to be predicted, the objective baseline may be the performance of the stock in a certain market over a certain time period.

In an embodiment, the objective baseline 526 is selected by the provider of the prediction system or the administrator of a contest. The provider may select the objective baseline based on the type of item being predicted. For example, the performance of a technology stock may be measured against the performance of NASDAQ. The performance of a non-technology stock may be measured against the performance of the NYSE. Alternatively or additionally, the provider may select the objective baseline based on the location of the item to be rated. For example, the performance of the stock of a company based in Japan may be measured against the performance of the Nikkei 225.

In a further alternative, the objective baseline 526 can be assigned based on criteria associated with related items. For example, the performance of a stock in a certain market sector may be measured against the performance of other stocks in that market sector. The performance of a quarterback may be rated against the performance of all other quarterbacks in a league (e.g., AFC, NFC, NFL, Big Ten, etc.).

The objective baseline may also include prediction duration information. The prediction duration indicates how long the prediction is pending. In an embodiment, the user can select the duration for the prediction. Alternatively or in addition, the prediction system sets the duration for a prediction. In an embodiment, the duration of a prediction is shortened by the occurrence of one or more events. For example, if a stock price reaches a predetermined value (e.g., $0), all predictions for that stock are ended.

FIGS. 6A-6D illustrate exemplary prediction entry portions, according to embodiments of the present invention. In FIG. 6A, the performance of a stock is being predicted. The stock prediction box 602A includes the item being predicted 610a (Stock A) and the objective baseline 626a (S&P 500 during a user-specified time frame). The stock prediction box 602A also includes a mechanism for entering the user prediction 624a (outperform or underperform). In this example, the user has the ability to enter an objective time frame defining the duration for measuring the prediction.

In FIG. 6B, the performance of an individual football player is being predicted. The player prediction box 602B includes the item being rated 610b (Player B) and the objective baseline 626b (rushing yards in Game X). The player prediction box 602A also includes a mechanism for entering the user prediction 624b (over 75 yards or under 75 yards).

In FIG. 6C, the winner of the academy award for best actress is being predicted. The award prediction box 602C includes the item being rated 610c (Best Actress Category) and the objective baseline 626c (2006 Academy Awards). The award prediction box 602C also includes a mechanism for entering the user prediction 624c (Actress who will win).

In FIG. 6D, the performance of a candidate in a presidential election is being predicted. The election prediction box 602D includes the item being rated 610d (Candidate C) and the objective baseline 626d (2008 Presidential Election). The election prediction box 602D also includes a mechanism for entering the user prediction 624d (range of electoral votes Candidate C will win).

Returning to FIG. 5, item display page 500 also includes a prediction listing portion 530. Prediction listing portion 530 includes one or more prediction entries 532a-n made for item 510. Each entry includes one or more of the following pieces of information: user ID 533 for user making the prediction, user rating 534 for the user, date of the prediction 535, the prediction 536, the current score for the prediction 537, and optional subjective information for the prediction 538.

Item information portion 540 includes a market information portion 542, a prediction system history portion 544, and a scuttlebutt portion 546. External information portion 542 includes information or links to information about the item from sources external to the prediction system. For example, for a stock, the external information may include market performance for the stock over a predetermined time frame. In the prediction system history portion 544, past and present prediction trends associated with the item are displayed. For example, the community sentiment scores for the item over the past month/year can be graphically displayed. The scuttlebutt portion 546 includes an interface for presenting additional information about the item. For example, if the item is a stock, scuttlebutt portion 546 may present information about the CEO, other corporate officers, and/or managers of the company. In addition, the scuttlebutt portion 546 may integrate Securities and Exchange Commission (SEC) information related to the companies and executives. The scuttlebutt portion 546 may also include information related to the performance of each company managed by the executive. For example, if CEO of Company A had been CEO of different companies, the scuttlebutt portion 546 may provide information on how each of the CEO's prior companies performed.

Returning to FIG. 3, in step 325, a prediction is received for the item. In addition, optional subjective supporting information associated with the prediction is received. A prediction is the user's forecast on how the item will perform versus the objective baseline. Subjective supporting information is information entered by the user to describe, justify or explain the prediction. Supporting information can be textual, audio, image, video, or any combination thereof. In an embodiment, subjective supporting information associated with a prediction can be added or edited by the user making the prediction anytime while the prediction is pending.

In step 330, the community sentiment score for the item is updated based on the newly entered prediction. The community sentiment score is a representation of the number of members of a universe who predicted a specific outcome associated with the item. The prediction system provider determines the outcome used to generate the sentiment score. For example, in FIG. 6A, the prediction system specifies the outcome as "Stock A will outperform the S&P 500." Therefore, the sentiment score is a proportion of how many users predicted that Stock A would outperform the S&P 500. Step 330 includes steps 332-380.

In step 332, a universe is identified. The community of predictors may include all predictors (e.g., universe 400 of FIG. 4). Alternatively, the universe may be a sub-set of all the users (e.g., universe 420 or 430 of FIG. 4).

In step 334, the current aggregate prediction component for the item is retrieved. When a user makes a prediction, an individual user component is calculated for the component. The current aggregate prediction component is a summation of the individual user components for all users making a prediction for the item prior to the entry of the current prediction. In an embodiment, the user component of one or more users may be weighted. The process of weighting is described in further detail in step 345.

In step 336, a determination is made whether the current user predicted the specified outcome. If the current user did not predict the specified outcome, operation proceeds to step 338. If the current user predicted the specified outcome, operation proceeds to step 340.

In step 338, the current user component is set equal to zero.

In step 340, a determination is made whether a weighting factor is to be applied to the current user component being calculated. If a weighting factor is to be applied, operation proceeds to step 345. If no weighting factor is to be applied, operation proceeds to step 350.

In step 345, a weighting factor is applied to the current user component. An individual's user component can be weighted, for example, based on the demonstrated ability of the individual as a predictor. In an embodiment, the user component is weighted by the user's proficiency score. Alternatively, the user component is weighted by the user's ranking within the universe. For example, a user with a high proficiency score may have a user component weighted by 1.2; while a user with a lower proficiency score may have user component weighted by 1.1. In addition, users with low proficiency scores are penalized. For example, a lowly ranked player may have a user component weighted by 0.9. Thus, users with higher proficiency have a greater impact on the item score.

In addition or alternatively, the user component may be weighted based on the proficiency of the user in an area associated with the item being predicted. For example, if the item being predicted is a biotechnology stock, the current user component may be weighted based on the user's proficiency in biotechnology stock predictions.

In step 350, the current user component is added to the current aggregate prediction component to achieve the final aggregate prediction value. For example, if the user component is not weighted, the unweighted user component is added to the current aggregate prediction component. If the user component is weighted, the weighted value is added to the current aggregate prediction component.

In step 362, a "fine" community sentiment score is calculated. The "fine" score provides precise information about the sentiment of the community related to the specified prediction for the item. In an embodiment, the "fine" score is a percentage of users (possibly weighted) predicting the specified outcome. In that embodiment, the final aggregate prediction value is divided by the total number of users making a prediction for the item. Because the "fine" score provides precise information, the provider of the prediction system may only provide the fine score to subscribers of the service or on a pay per view arrangement. In an embodiment, the "fine" score is mathematically represented by the following equation:

$$\text{"fine" score} = \frac{\sum \text{user components for users making specified prediction}}{\text{total number of users making a prediction for the item}}$$

In step 364, a "gross" community sentiment score is determined. The "gross" community sentiment score is a rough estimate of the score within one of multiple levels. In an embodiment, four levels or quartiles are established. The "gross" score reflects in which level or quartile the "fine" score falls. For example, an item with a "fine" score of 76-100 has a "gross" score of Quartile-1; an item with a "fine" score of 51-75 has a "gross" score of Quartile-2; an item with a "fine" score of 26-50 has a "gross" score of Quartile-3; and an item with a "fine" score of 1-25 has a "gross" score of Quartile-4. Because the "gross" score is a rough approximation, the system may provide the "gross" score to all users. In an embodiment, the display format of the "gross" score indicates its level (e.g., Quartile-1 scores shown in red, Quartile-2 scores shown in blue, etc.).

In step 370, a determination is made whether the community sentiment score for another universe is to be calculated. The prediction system may provide a community sentiment score associated with multiple universes. A certain subset of users may provide better or more precise intelligence for a particular item. For example, a universe consisting of the top performers may generate a more precise community sentiment score than the universe of all users. If an additional community sentiment score is to be calculated, operation returns to step 332. If no additional community sentiment rating is to be calculated, operation proceeds to step 380.

The following is an example of the determination of a "fine" and "gross" community sentiment score for the stock prediction of FIG. 6A. Assume the specified outcome defined by the system for the stock A is "outperform." In the example, 100 users made a prediction for stock A: 51 predicted outperform, and 49 predicted underperform. If the user components are unweighted, the "fine" community sentiment score is 51% and the "gross" score is Quartile-2. In a further example, 10 of the users predicting outperform have a rating of greater than 75. In this example, user components are weighted by 2 for all users having a rating of greater than 75. If the user components are weighted, the "fine" community sentiment score is 61% and the "gross" score remains Quartile-2.

In step 380, the community sentiment score or scores is presented to a user. As shown in the example item page of FIG. 5, the display page for item 510 shows a fine community sentiment score for community A 516, a gross community sentiment score for community A 512, a fine community sentiment score for community B 518, a gross community sentiment score for community B 514.

2.2 Method for Determining the Proficiency of a Predictor

Figure 7:
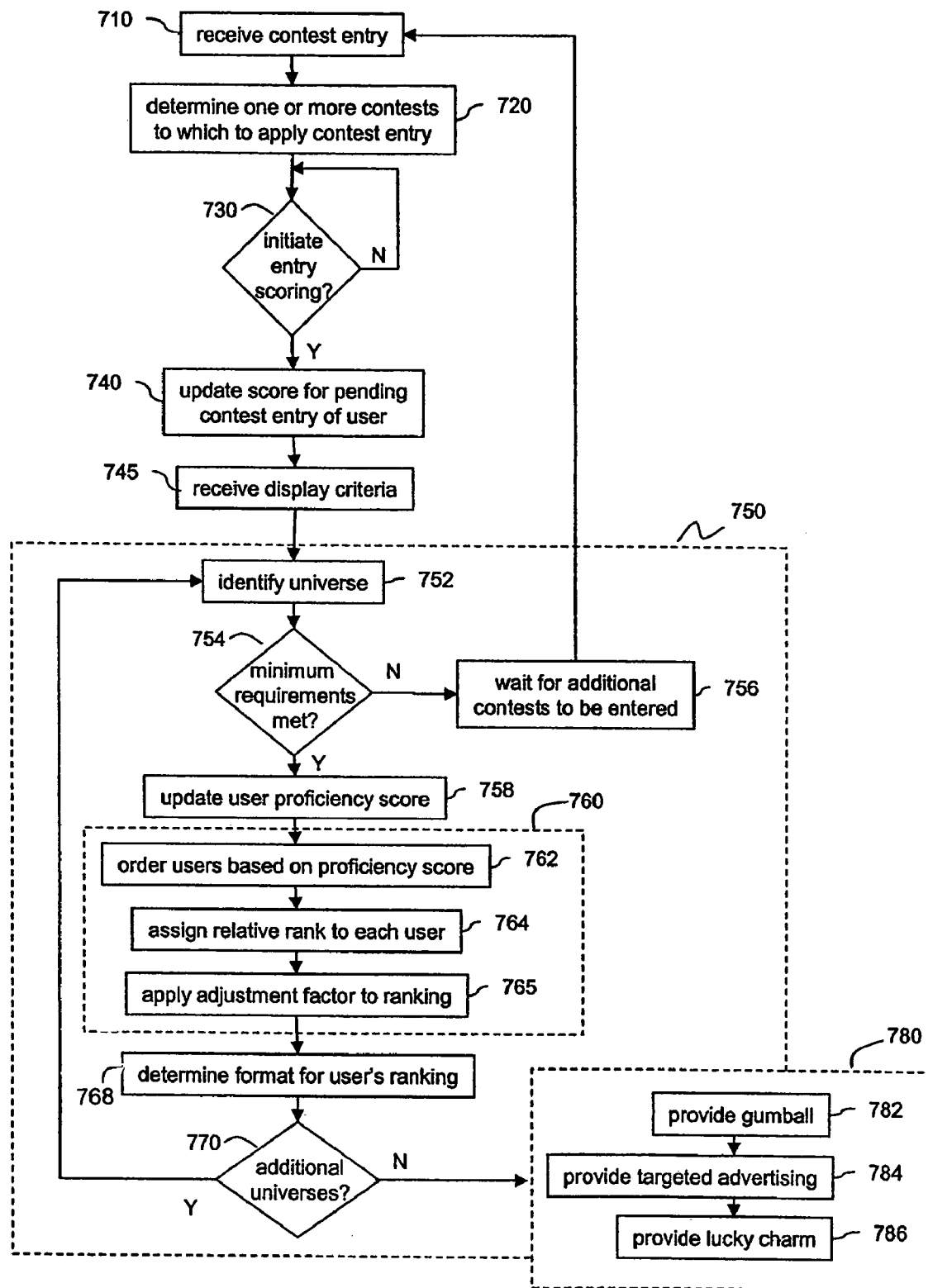
FIG. 7 depicts a flowchart of a method for determining the proficiency of a predictor, according to an embodiment of the present invention.

FIG. 7 depicts a flowchart 700 of a method for determining the proficiency of a predictor, according to an embodiment of the present invention. Flowchart 700 will be described with continued reference to the example system architecture 100 described in reference to FIG. 1. However, the invention is not limited to those embodiments. Note that some steps shown in flowchart 700 do not necessarily have to occur in the order shown.

The proficiency of a predictor is determined in a contest setting. A contest is a competition among a set of users in which each user performs individually through contest entries. A prediction system may have multiple contests occurring simultaneously. In addition, an individual user may complete in one or more contests simultaneously.

Each contest is associated with a universe, a duration and a domain. A universe is the set of users against whom the user will be ranked. A universe can have any number of users. For example, a universe can be defined as all users of the prediction system. A universe can also be defined as users in a user-specified group such as a competitive league. For example, a user may set-up a stock picking league or a football prediction league. A universe can also a group of users defined by the administrator of the prediction system. For example, the administrator of the prediction system may establish a special contest. The universe is then defined as the users who register for the contest. A universe can also be a group of users defined by a third party partner. For example, a third party partner (e.g., administrator of third party server 130 or Internet property such as Yahoo!) may define a universe as all users accessing the prediction system via the third party.

The contest domain defines the type of items that can be predicted during the contest. For example, a domain may be stocks traded on a certain market. In another example, the domain may be players in a specific sports league.

The duration of the contest may be open-ended, defined by the administrator of the prediction system, defined by the administrator of a contest, or defined by an individual user. For example, for a sports related contest, the duration may be the length of the season. For an awards show contest, the duration of the contest is from a predetermined start date until the completion of the awards show.

Flowchart 700 begins in step 710 when a contest entry is received from a user. A contest entry is an individual prediction associated with an item. A contest entry includes prediction information and an objective baseline. A contest entry may also include subjective supporting information related to the prediction from the user. Examples of contest entries are shown in FIGS. 6A-6D, described above. In an embodiment, a user is limited to one pending contest entry per item and baseline combination. In an embodiment, an item can be predicted against multiple baselines. For example, the performance of item A can be predicted against baseline 1, baseline 2, or baseline 3. A user can enter 3 contest entries associated with the item: item A/baseline 1, item A/baseline 2, and item A/baseline 3.

In an embodiment, multiple contest entries are entered simultaneously for a user. The multiple contest entries can be received by the prediction system on a computer readable media or over data communications interface. The contest entries may be provided in a format specified by the prediction system. For example, in a stock prediction contest, a user may wish to use the prediction system to track the performance of his investment portfolio. The brokerage uploads the portfolio stocks to the prediction system which then creates a contest entry for each stock.

In step 720, the prediction system determines one or more contests to which contest entry applies.

In an embodiment, the contest entry is applied to one or more contests associated with contests/universes of which the user is a member. In the example of FIG. 4, user B 410b is a member of universes 400 and 420. Therefore, his contest entry could be applied to the contest associated with each of these universes. This embodiment of step 720 is described in further detail in Section 2.2.1, below.

In an alternate embodiment, the user selects the contest to which the entry applies. For example, a user may be presented with a listing of all universes of which the user is a member in the domain of the contest entry. The user then selects one or more of the listed universes to apply the entry. Default processing is provided if a user fails to select a universe. The system administrator may define default processing for all contests or may define default processing on a per contest basis.

For example, a user may enter a special contest offered by the system provider or a contest associated with a subset of users. Because the user may use a different prediction strategy in these contests, the user may not want contest entries entered in these contests to impact his ranking in other universes (e.g., universe of all users).

In a further embodiment, a third party partner selects the contest(s) to which the contest entry applies.

At the completion of step 720, the contest entry is considered a pending contest entry. A contest entry is pending until the duration of the contest entry has elapsed. For example, in FIG. 6A, if the user selects one week as the contest entry duration, the contest entry is pending for a week after the entry is submitted.

In step 730, the prediction system determines whether scores for one or more pending contests should be calculated. A score for a pending contest is calculated when one or more scoring initiation criteria are met (e.g., elapsed time period, request for scoring received, etc). In this step, a determination is made whether scoring initiation criteria have been met. If the scoring initiation criteria have not been met, operation remains at step 730. If the scoring initiation criteria have been met, operation proceeds to step 740.

The scoring initiation criteria determine when the score for one or more entries should be updated. In an embodiment, scores are updated periodically at the end of a pre-defined interval. For example, scores may be updated every hour, every 30 minutes, once a day, etc.

In an alternate embodiment, scores are updated upon the occurrence of a specific event. For an awards show contest entry, scores may be updated when the award for the item has been presented or at the end of the awards show. For a football related contest entry, scores may be updated at the end of each quarter.

In a further embodiment, scores are updated when a request is received from the user. For example, a user may submit a request to have the scores of all his pending contest entries updated.

In another further embodiment, scores are updated in real-time or delayed real-time. For example, the score for a contest entry associated with a stock may be continuously updated while the baseline market is open. The score for a contest entry associated with the performance of a player may be continuously updated while a game is being played.

The score of a pending contest entry may change throughout the duration of the contest. The score of a non-pending (completed) contest entry does not change.

In step 740, the score for each pending contest entry is updated. A contest entry score is given by the following equation:

$$\text{score} = W_1 \cdot W_2 \cdot W_3 \ldots W_n \cdot (\text{prediction score})$$

The prediction score is derived by a comparison of the prediction with the objective baseline. For example, for a stock contest entry such as shown in FIG. 6A, the prediction score is the difference between the change in the stock and the change in the market index (objective baseline). Mathematically, this is represented as:

$$\text{prediction score} = \Delta \text{stock} - \Delta \text{index}$$

For example, if the user in FIG. 6A predicted Stock A would outperform the S&P 500 and Stock A gains 1.5% while the S&P 500 gains 1%, the prediction score is 0.5. If the user predicted that Stock A would underperform the S&P 500, the prediction score would be −0.5.

As can be seen in the above example, selection of the objective baseline index is critical. In the stock prediction example, if a user predicts a stock after the baseline market for the item has closed, the opening price of the stock in the market and the market value is used as the initial objective baseline. Alternatively, the closing price of the stock and market value is used. In a further alternative, an average of the opening and closing numbers can be used. As would be appreciated by a person of skill in the art, other methods for determining the initial objective baseline can be used with the present invention.

For an award category contest entry such as shown in FIG. 6C, the prediction score may simply be a 1 if user correctly predicted the winner or 0 if the user did not correctly predict the winner. As would be appreciated by persons of skill in the art, other methods for determining the prediction score can be used with the present invention.

In addition, one or more optional weights, $W_1$-$W_n$, may be applied to the prediction score. Optional weights may include one or more difficulty rating weights. A difficulty rating weight alters the prediction score to reflect the difficulty or risk associated with the prediction. In an embodiment, a difficulty rating weight is associated with the duration of the contest entry. For example, if the contest entry spans a long duration, the prediction associated with the contest entry is considered more difficult and given a heavier weight.

In addition or alternatively, a difficulty rating weight is associated with the difficulty of predicting the item in the entry. For example, the performance of a volatile stock is difficult to predict. Therefore, when the user elects to predict the performance of a volatile stock, the prediction score is given a heavier weight. In a further example, odds may be assigned to the prediction options offered to a user in a contest entry. In the example award category prediction of FIG. 6C, Actress A may have 2:1 odds of winning; Actress B may have 10:1 odds of winning; Actress C may have 50:1 odds of winning, and Actress D may have 3:1 odds of winning. Therefore, a prediction of Actress C is given a heavier weight because it is riskier than predicting one of the other Actresses.

Optional weights, $W_1$-$W_n$, may also include one or more penalty weights. A penalty weight is designed to lower the prediction score based on an action or inaction of the user which reduced the predictive value of the contest entry. In an embodiment, an optional penalty weight is associated with a user ending a contest entry before the duration has elapsed. In an embodiment, one or more penalty weights operate as multipliers. In addition, or alternatively, one or more penalty weights operate as subtractors.

In step 745, the display criteria for the contest entry are retrieved. In an embodiment, the user and/or system provider configures display criteria for the contest entry (or user). Display criteria include the pages on which the contest entry is displayed and what users can access the information. As a default, after a contest entry has a score, the contest entry is entered in the set of predictions displayed on the item's display page (e.g., as entry 532 in prediction listing portion 530 of FIG. 5) and on the user's individual display page. The display criteria may indicate that contest entries for this user are only to be displayed to users paying a fee or subscription charge. Alternatively, the display criteria may indicate that contest entries for this user are not to be displayed. Display criteria may also indicate when a contest entry is posted to a particular page. For example, contest entries for high performers may be delayed for a predetermined period of time.

In step 750, the proficiency and ranking of the user within the universe of the contest is determined. Step 750 includes steps 752-770. Step 750 is repeated for each contest to which the contest entry applies.

In step 752, a contest/universe is identified.

In step 754, a determination is made whether the user has met the minimum requirements for being ranked within the universe of the identified contest. In an embodiment, a user is required to make a pre-determined number of contest entries before the user can be ranked in a universe. Alternatively or additionally, a user is required to have made at least one contest entry within a pre-determined period of time prior to the ranking. For example, a user may be required to have made a contest entry within the past 7 days to be ranked. If the user has not met the requirements for being ranked within the identified universe, operation proceeds to step 756. If the user has met the requirements for being ranked in the universe, operation proceeds to step 758.

In step 756, the prediction system waits for additional contest entries to be made by the user. Operation proceeds to step 710.

In step 758, the proficiency score for the user is calculated. The proficiency score can be calculated each time a contest entry score is determined or after a predetermined time period. In an embodiment, the proficiency score is given by the following equation:

$$\text{proficiency score} = W_1 \cdot W_2 \cdot W_3 \ldots W_n \cdot (W_A \cdot \text{accuracy} + W_B \cdot \text{total score})$$

Accuracy represents the percentage of times the user is correct in predicting items in a contest. In an embodiment, accuracy is determined according to the following equation:

$$\text{accuracy} = \frac{\text{number of correct predictions in a contest}}{\text{total number of contest entries in a contest}}$$

The total score is the summation of the contest entry scores for the user in the contest. As would be appreciated by persons of skill in the art, other techniques for determining the proficiency score, accuracy, and/or total score can be used with the present invention.

Weights $W_A$ and $W_B$ are optional. In an embodiment, the prediction system administrator or the contest administrator may choose to weight the accuracy component differently than the total score component. For example, the proficiency score may be calculated as:

$$\text{proficiency score} = \frac{1}{3}*\text{accuracy} + \frac{2}{3}*\text{total score}$$

In this example, total score is weighted more heavily than accuracy. As would be appreciated by a person of skill in the art, any weight could be applied to the accuracy or total score.

The proficiency score may be modified by one or more proficiency score weights $W_1$-$W_N$. Proficiency score weights are also optional. When present, proficiency score weights are based on attributes or actions associated with the user or contest entries of the user. The following are examples of proficiency score weights that can be used in the present invention.

A proficiency score weight may reflect the risk of the contest entries engaged in by the user. For example, if the user consistently makes safe contest entries, the proficiency score weight may lower the proficiency score of the user (e.g., $W_1$=0.9). However, if the user consistently makes risky contest entries (e.g., predicts performance of volatile stocks), the proficiency score weight may raise or lower the proficiency score of the user (e.g., $W_1$=1.1).

A proficiency score weight may reflect the number of contest entries made by the user or the number of contest entries that the user has won or is winning. In this way, a user that makes a large number of contest entries has her proficiency score weighted more heavily than a user that makes a few or the minimum number of contest entries.

A proficiency score weight may also reflect instances where the user was correct in the right direction in a contest entry but did not necessarily win the contest entry. For example, in the stock prediction contest entry of FIG. 6A, a user may have predicted that Stock A will outperform the S&P 500. However, although Stock A rose during the duration of the contest entry, Stock A did not outperform the S&P 500. In this case, the user did not make a correct prediction but did predict the correct direction of the stock (i.e., up).

A proficiency score weight may also reflect external factors associated with the user such as the user's reputation with other users. For example, the proficiency score of a user may be increased each time another user pays for requests to see a prediction made by the user. In a further example, the proficiency score of a user may be increased each time the user is placed on a watch list by another user. In addition, the proficiency score of a user may be increased based on the number of recommendations comments entered by the user receives.

In step 760, the ranking of the user within the identified universe is determined. Step 760 includes steps 762, 764, and 765.

In step 762, all users in the identified universe are ordered based on their proficiency score within the universe.

Figures 8, 9:
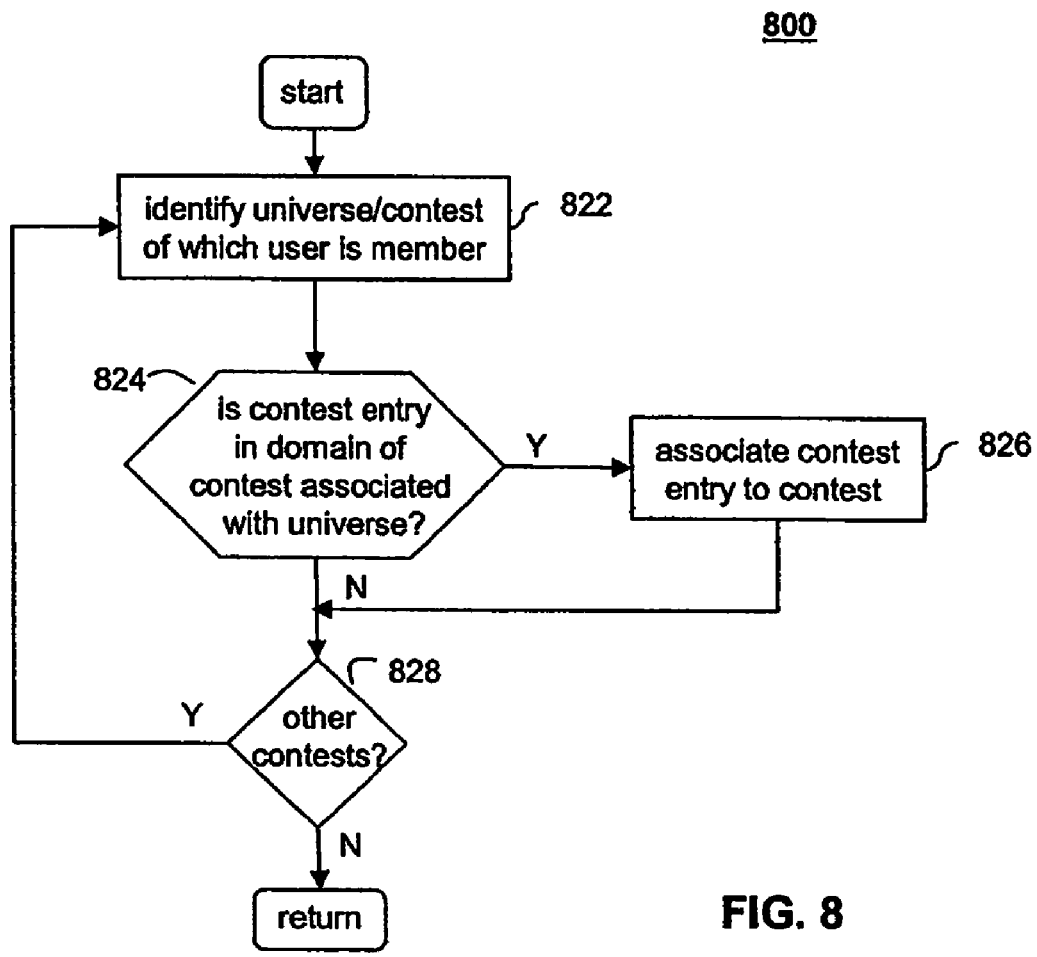
FIG. 8 depicts a flowchart of a method for determining one or more contests to which to apply the contest entry, according to an embodiment of the present invention.
FIG. 9 depicts an exemplary ranking of users in the universe "Stock Rating League #1," according to an embodiment of the present invention.

In step 764, a relative ranking is assigned to each user in the identified universe. For example, the user with the highest proficiency score may be given a ranking of 100. FIG. 9 depicts an exemplary ranking of users in the universe "Stock Rating League #1."

In step 765, an adjustment factor is applied to the user's ranking. This step is optional. In an embodiment, the adjustment factor is determined by information associated with the past performance and/or reputation with other users of the user. For example, one or more charms, described in step 786 below, may cause the user's ranking to be adjusted.

In step 768, the format of the user's ranking is determined. This step is optional. In an embodiment, the user has the ability to configure whether his rank is displayed as a number or as being within a certain level of users (e.g., user A is in Quartile-3 of users).

In step 770, a determination is made whether the user is participating in another contest. If the user is participating in another contest, operation returns to step 752. Steps 754-770 are repeated for each universe of which the user is a member. If the user is not participating in another contest, operation proceeds to step 780.

In step 780, additional information, rewards, awards, and/or advertising is provided to the user. Step 780 includes steps 782, 784, and 786. As would be appreciated by persons of skill in the art, steps 782, 784, and/or 786 can occur at any time in flowchart 710. They are included after step 770 for ease of description.

In step 782, an informational message (referred to herein as a "gumball") is provided to a user. A gumball is information, advice, rewards, or offers presented to a user. Step 782 is described in further detail in Section 2.2.2.

In step 784, targeted advertising is provided to the user. In an embodiment, the advertising displayed to the user is selected based on the item being predicted by the user. For example, if the user is predicting positive performance of stock A, then an advertisement related to a product from company A is displayed. If the user is predicting negative performance of stock A, then an advertisement related to a product from a competitor to company A is displayed. Additionally or alternatively, the advertising displayed to the user is selected based on the how the user accessed the prediction system. For example, if the user linked to the prediction system through a third party server 150, advertisements related to the third party may be displayed to the user. In addition or alternatively, advertisements may be based on a user's investing styles.

In step 786, a charm is provided to the user. Charms are associated with a user and indicate attributes related to the performance or reputation of the user. Charms may be displayed next to a user's ID on one or more pages. A user may have any number of charms associated with his user identity. Charms may be user status charms or helpfulness charms. Charms are awarded based on a number of possible criteria. For example, status charms may be awarded when a user meets certain performance metrics. Helpfulness charms may be awarded based on a user's reputation among other users.

Examples of status charms include king of the hill charms, all star charms, high score club charms, highest score per item charms, rating improvement charms, or inactive charms. The king of the hill charm is given to the highest ranked user in a contest. The all star charm is awarded to a user if the user is ranked within the top X% of users in a universe. The high score club charm is awarded to a user that has contest entry score of at least a certain value. The highest score per item charm is awarded to the user who has the highest contest entry score for a specific item. For example, if 10 users make a prediction for Stock A, the user with the highest contest entry score is awarded this charm. The rating improvement charm is awarded to a user who has improved his user ranking in a universe by a certain number of places in a predetermined time. The inactive charm is given to a user who has not made a new entry within a predetermined period of time.

An example of a helpfulness charm is a subjective information helpful charm. The subjective information helpful charm is awarded to a user who has had a predetermined number of subjective information entries associated with a prediction marked as helpful by other users. More details on marking subjective information as helpful are provided in Section 2.3.3.

2.2.1 Method for Determining Application of a Contest Entry

FIG. 8 depicts a flowchart 800 of a method for determining one or more contests to which a contest entry applies, according to an embodiment of the present invention. Note that some steps shown in flowchart 800 do not necessarily have to occur in the order shown.

In step 822, a universe of which the user is a member is identified. For user B in the example of FIG. 4, universe 400 is identified.

In step 824, a determination is made whether the contest entry is in the domain of the contest associated with the identified universe. For example, if the domain of the contest for universe 400 is stocks, then contest entry 600A of FIG. 6A applies to the contest of universe 400. However, contest entries 600B-D would not apply to the contest of universe 400. If the contest entry is in the domain of the contest, operation proceeds to step 826. If the contest entry is not in the domain of the contest, operation proceeds to step 828.

In step 826, the contest entry is associated with the contest of the identified universe. Operation proceeds to step 828.

In step 828, a determination is made whether an additional universe has been identified. For example, for user B, a second universe 420 is identified. If additional universe is identified, operation returns to step 824. If all universes have been identified, operation proceeds to step 829 where processing of flowchart 800 ends.

2.2.2. Method for Providing an Informational Message

Figure 10:
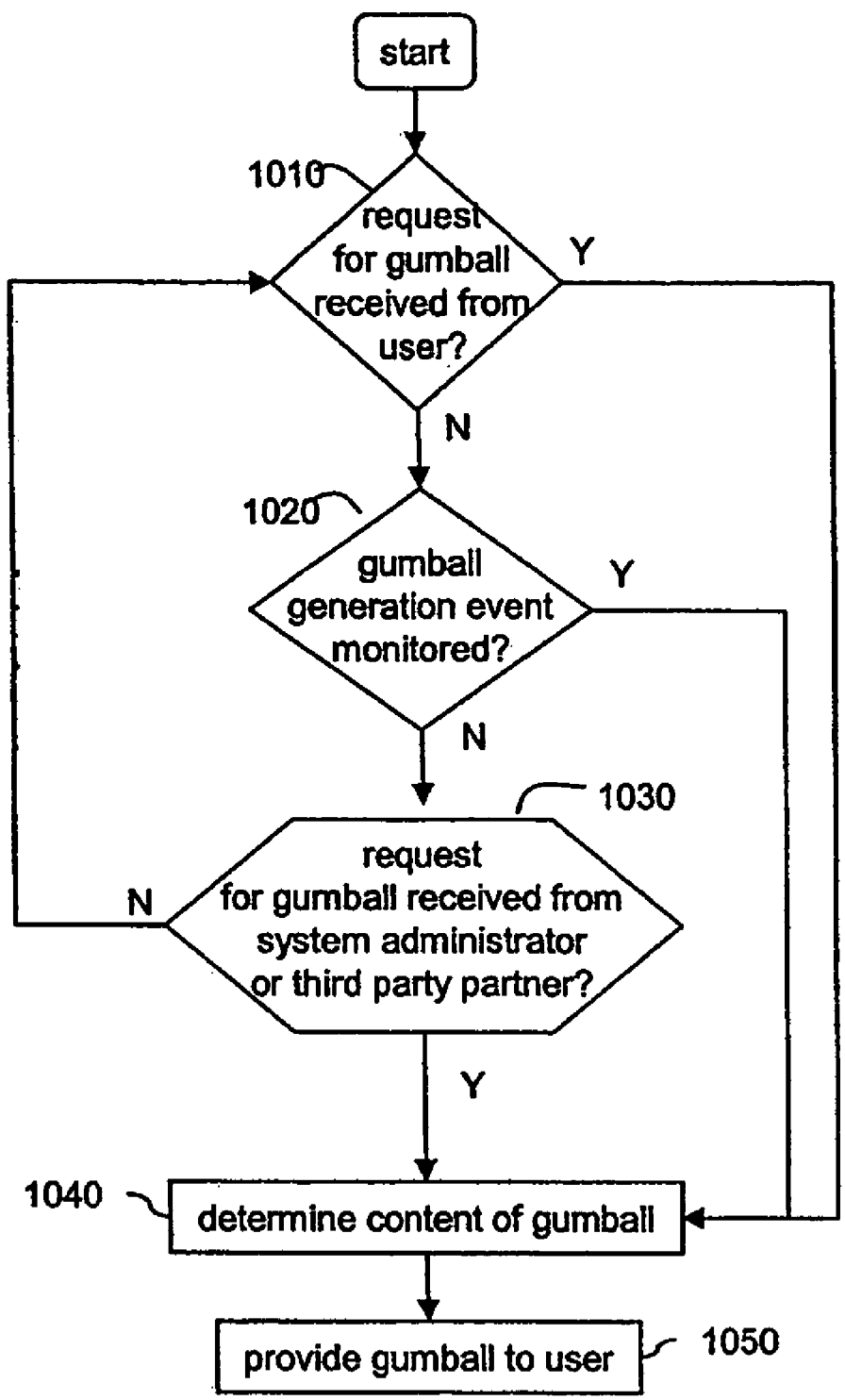
FIG. 10 depicts a flowchart of a method for providing a gumball, according to an embodiment of the present invention.

FIG. 10 depicts a flowchart 1000 of a method for providing an informational message (referred to herein as a "gumball"), according to an embodiment of the present invention. Note that some steps shown in flowchart 1000 do not necessarily have to occur in the order shown.

Flowchart 1000 begins in step 1010 when a determination is made whether a request for a gumball has been received from a user. Step 1010 is optional. A user may request a gumball at any time or at specified times during a contest. In the request for the gumball, a user may indicate the type of information or advice desired. Alternatively, a user may request a random gumball. The prediction system may charge a fee for a user-requested gumball. If a request for a gumball is not received, operation proceeds to step 1020. If a request for a gumball is received, operation proceeds to step 1040.

In step 1020, a determination is made whether one or more gumball generation events has occurred. Step 1020 is optional. A gumball generation event is an occurrence or set of occurrences which causes the system to generate a gumball. The prediction system may have multiple gumball generation events. If a gumball generation event has occurred, operation proceeds to step 1040. If a gumball generation event has not occurred, operation proceeds to step 1030.

The following are examples of gumball generation events:
contest entry score within a predetermined range
proficiency rating within a predetermined range
selection of a particular item by the user
passage of a pre-determined period of time
pre-determined number of contest entries made
user biggest score loser for the day
user biggest score gainer for the day
passage of a pre-determined period of time without contest entry As would be appreciated by persons of ordinary skill in the art, other types of gumball generation events could be defined for the present invention.

In step 1030, a determination is made whether a request for a gumball was received from the administrator of the prediction system or from a third party partner. Step 1030 is optional. In this embodiment, the request may include an indication of the desired content of the gumball. The prediction system administrator may initiate the generation of a gumball to announce or market certain activities or products. A third party partner may also initiate the generation of a gumball for similar reasons or to reward a set of users who match certain criteria. If a request for a gumball was received from the administrator of the prediction system, operation proceeds to step 1040. If no request for a gumball was received, operation returns to step 1010.

Steps 1010-1030 represent different mechanisms available to initiate generation of a gumball. One or more of these steps may be present. In addition, these steps can occur in any order or in parallel. As would be appreciated by persons of skill in the art, other techniques for initiating the generation of a gumball can be used with the present invention.

In step 1040, the content of the gumball is determined. The content of a gumball may be based on information provided in a request for a gumball or based on the events which initiated the generation of the gumball. Examples of gumballs are provided below.

A gumball may be personalized for an individual user by the prediction system. For example, the prediction system may access a profile associated with the user stored in database 120. Based on information in the user profile, the system generates a gumball personalized for the user. For example, if the user consistently makes contest entries related to technology stocks, the gumball may include advice or tips related to technology stocks. In an embodiment, if a user is struggling with predictions in a certain area of a contest, the gumball may provide information on how successful players in the contest are making predictions.

A gumball may also be generic. A generic gumball contains content that applies to multiple users. For example, the prediction system may develop multiple generic gumballs during a predefined period (e.g., a day). A generic gumball may be associated with a particular area. For example, the system may generate a gumball with information and advice on pharmaceutical stocks and a gumball with information and advice on software stocks. In a further example, a generic gumball may include the recent selection(s) of the top-rated player in the system or a listing of the most popular items in the contest.

A gumball may also include a prize or an offer. For example, if the user is the top rated player in a contest, the system may provide the user with a prize such as reduced subscription rate, gift certificate, or free access to a paid service offered by the system, etc. In addition, if a user selects a certain item, the user may be provided with an offer related to the item selected, an offer related to a similar item, or an offer from a competitor. For example, if the user predicted positive performance of stock A, a gumball with an offer for one of company A's products may be provided. If the user predicted negative performance of stock A, a gumball with an offer for a product of a competitor to company A may be provided.

In step 1050, the gumball is provided to the user. In an embodiment, the gumball is e-mailed to the user. Additionally or alternatively, the gumball may be provided to the user through the user interface the next time the user accesses the prediction system. For example, the gumball may appear as an icon on the user's display page. The method of providing the gumball to the user may be determined by the events which initiated the generation of the gumball or by the content of the gumball. For example, if the gumball was generated because the user has not made a contest entry in a predetermined period of time, the gumball is provided via e-mail. As would be appreciated by persons of skill in the art, other mechanisms for providing gumballs to users can be provided with the present invention.

Figure 11:
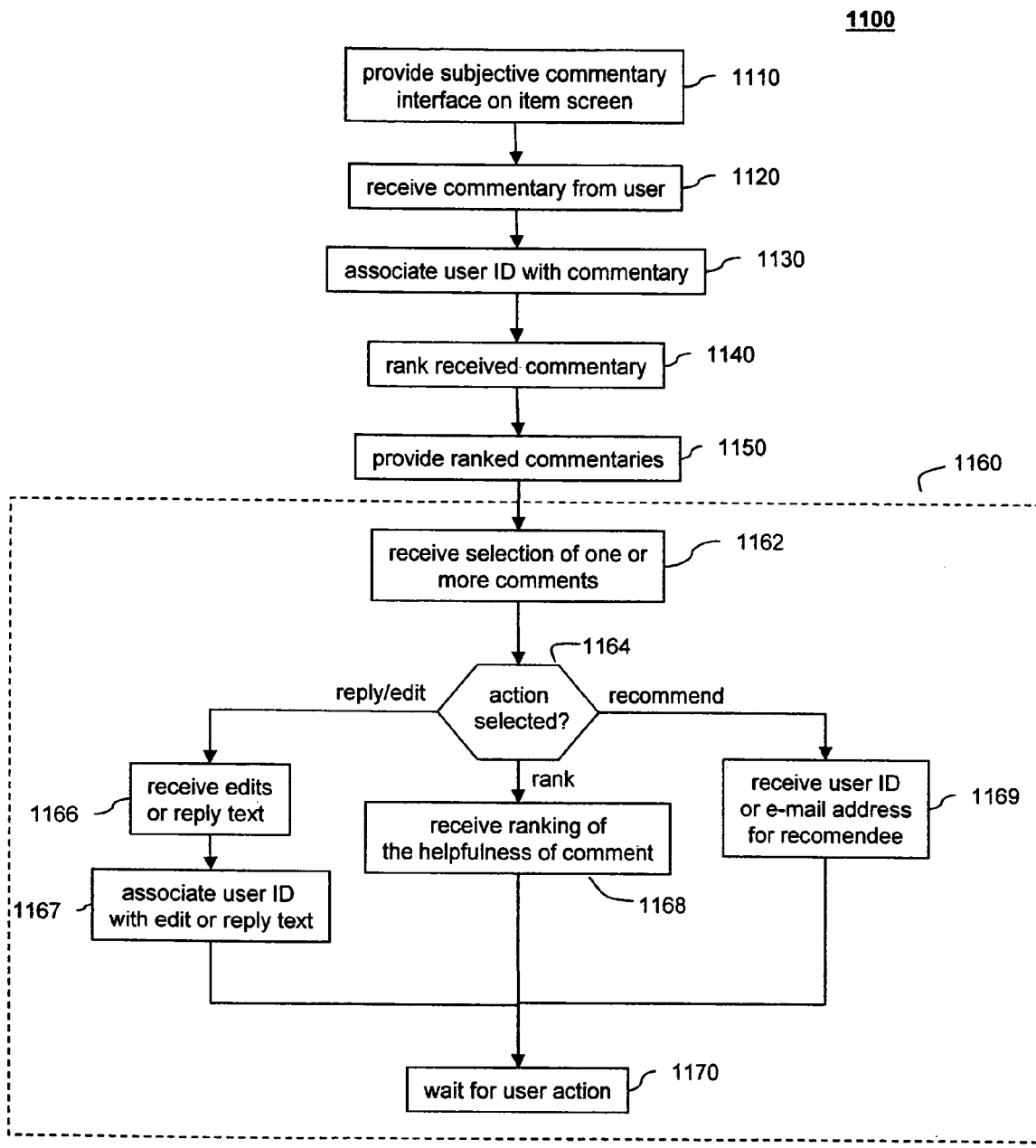
FIG. 11 depicts a flowchart of a method for providing commentary threads associated with an item, according to an embodiment of the present invention.

2.3 Methods for Providing Subjective Commentary on an Item 2.3.1 Method for Providing Commentary Threads Associated with an Item FIG. 11 depicts a flowchart 1100 of a method for providing commentary threads associated with an item, according to an embodiment of the present invention. Flowchart 1100 will be described with continued reference to the example system architecture 100 described in reference to FIG. 1. However, the invention is not limited to those embodiments. Note that some steps shown in flowchart 1100 do not necessarily have to occur in the order shown.

Figure 12:
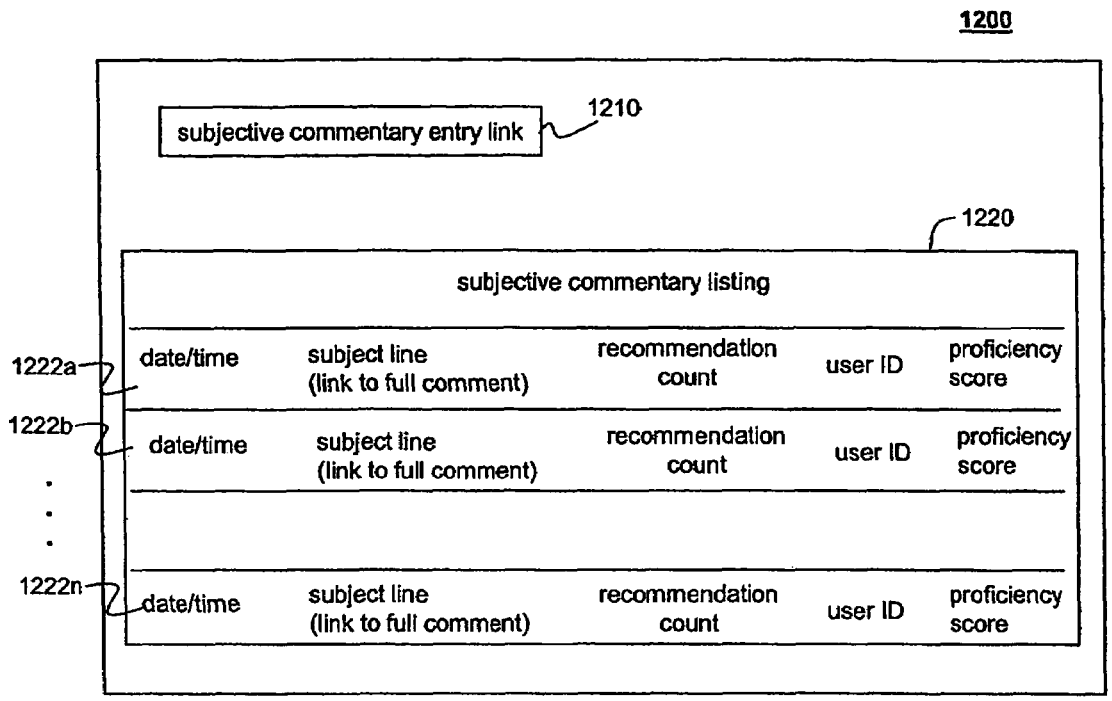
FIG. 12 depicts an exemplary subjective commentary interface associated with an item, according to an embodiment of the present invention.

Flowchart 1000 begins in step 1110 when a subjective commentary interface associated with an item is provided. FIG. 12 depicts an exemplary subjective commentary interface 1200 associated with an item, according to embodiments of the present invention. As can be seen in FIG. 12, the subjective commentary interface includes one or more prior subjective comments 1202 entered by other users and a mechanism 1204 to enter new commentary. In an embodiment, the subjective commentary interface may include a plurality of commentary categories.

In step 1120, commentary is received from a user. Commentary can take any form including text, video, image, audio, or any combination thereof.

In step 1130, the user identifier (ID) of the user entering the commentary is associated with the comment. In the example of FIG. 12, comment 1202a is associated with user ID TMF-Googly.

In step 1140, the received commentary is included in the set of prior entered comments and the set is ranked. In an embodiment, the comments are ranked according to the proficiency the user associated with the comment. In an alternate embodiment, the comments are ranked according to the player ranking of the user in the universe of all users. Step 1140 is optional. When step 1140 is not present, the comments are not ranked.

In step 1150, the newly ranked comments are provided to the user.

In step 1160, the user interacts with entered comments. Step 1160 includes steps 1162-1169. Step 1160 is optional. When step 1160 is not present, users can only view entered comments.

In step 1162, a selection of one or more entered comments is received.

In step 1164, the action selected by the user is received. If the user selects "edit" or "reply," operation proceeds to step 1166. If the user selects "rank," operation proceeds to step 1168. If the user selects "recommend," operation proceeds to step 1169. As would be appreciated by persons of skill in the art, other interaction options may be provided with the present invention.

In step 1166, edits or reply text associated with the comment are received.

In step 1167, the user ID of the user entering the edit is associated with the edit.

In step 1168, a ranking of the helpfulness of the comment is received for the user. For example, a user may rank the comment as very helpful, moderately helpful, not very helpful, or useless. Other techniques for ranking comments are anticipated by the present invention including numerical rankings.

In step 1169, a user ID or e-mail address is received for recommending the comment. The system then transmits the recommendation to the identified user ID or e-mail address.

2.3.2 Method for Providing Brief Informational Tags Associated with an Item

Figure 13:
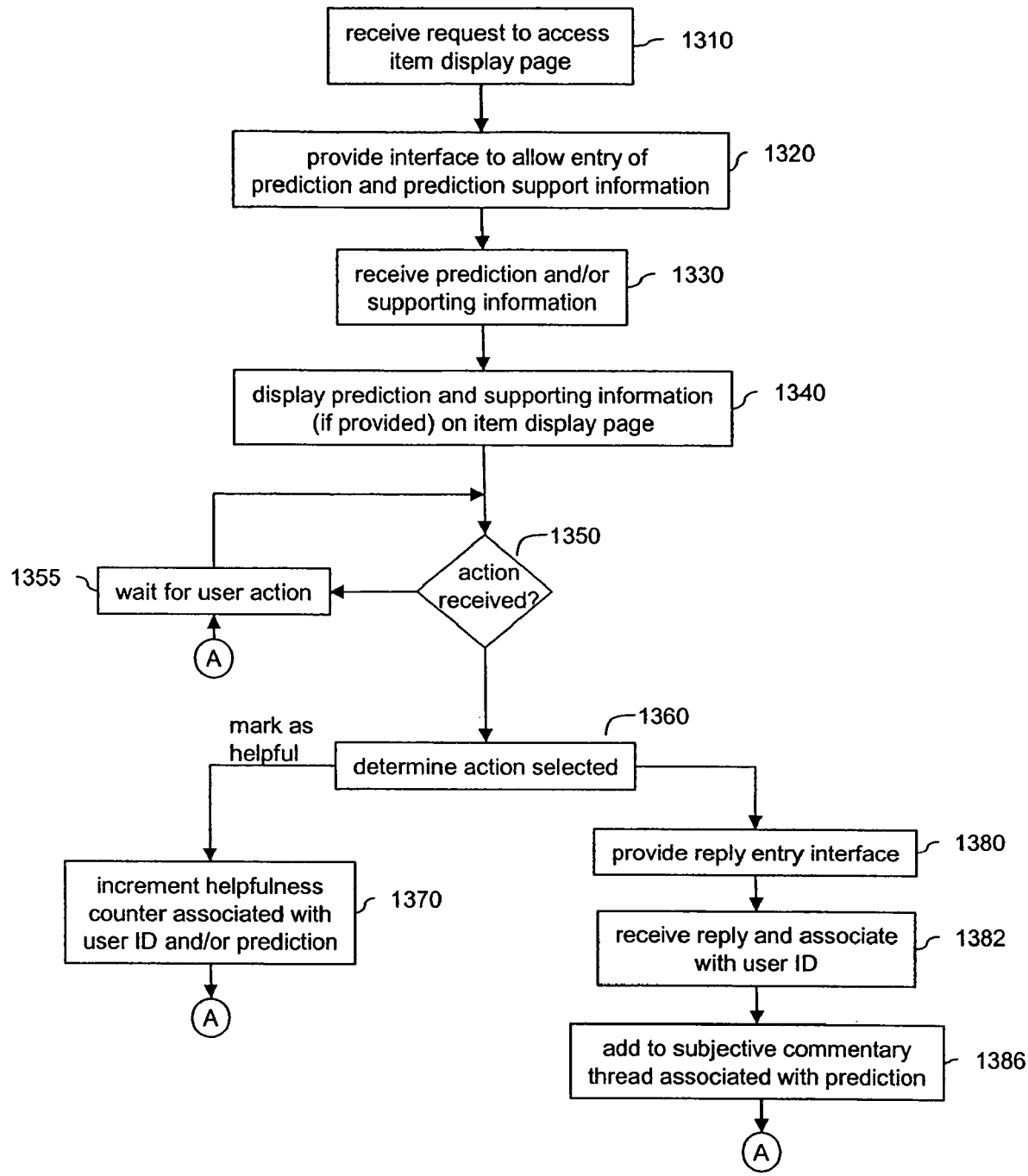
FIG. 13 depicts a flowchart of a method for providing flavor tags associated with an item, according to an embodiment of the present invention.

FIG. 13 depicts a flowchart 1300 of a method for providing brief informational tags associated with an item, according to an embodiment of the present invention. Flowchart 1300 will be described with continued reference to the example system architecture 100 described with reference to FIG. 1. However, the invention is not limited to those embodiments. Note that some steps shown in flowchart 1300 do not necessarily have to occur in the order shown.

A brief informational tag (referred to herein as a "flavor tag") is a brief subjective statement associated with an item. A flavor tag may be limited to a predetermined number of characters. In an embodiment, a flavor tag is limited to 40 characters. Because of their limited size, flavor tags are brief facts, characterizations, or conversation pieces associated with an item. A display page associated with an item includes a list of flavor tags that have met one or more requirements. For example, a flavor tag may not be listed on the item display page until a predetermined number of positive votes have been received for the flavor tag. As depicted in FIG. 5, the item display page 500 includes a flavor tag listing portion 570. One or more of the flavor tags listed in the flavor tag listing portion includes a link to the flavor tag display page for the item.

Figure 14:
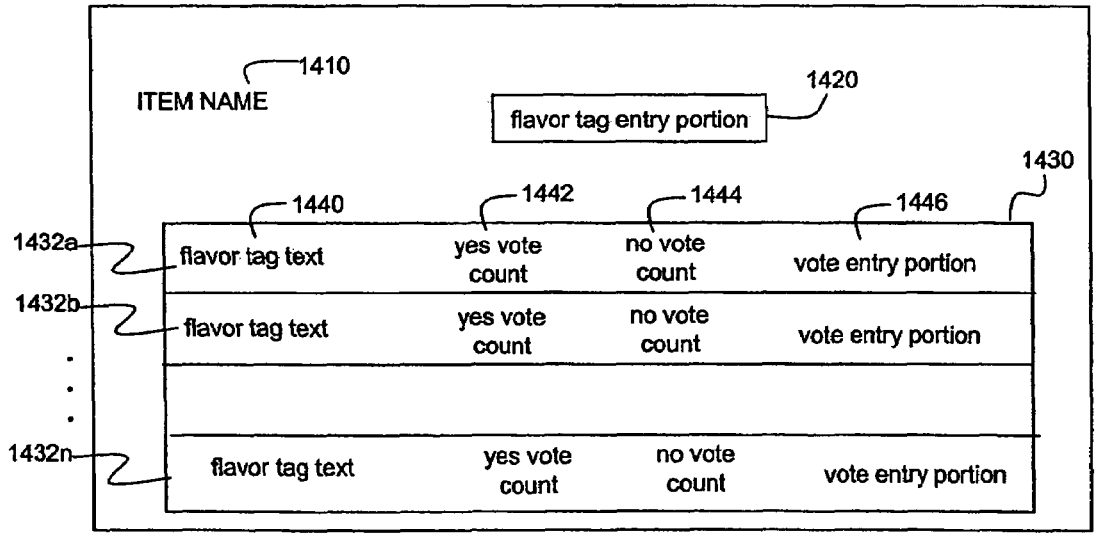
FIG. 14 depicts an exemplary flavor tag display page for the item, according to embodiments of the present invention.

On the flavor tag display page, all approved flavor tags entered for the item are displayed. FIG. 14 depicts an exemplary flavor tag display page 1400 for the item, according to embodiments of the present invention. Exemplary flavor tag display 1400 includes the item name 1410, a flavor tag entry portion 1420, and a flavor tag listing 1430. The flavor tag entry portion 1420 provides an interface for a user to add a new flavor tag to be associated with the item. Flavor tag listing portion 1430 includes one or more flavor tag entries 1432a-n. Each flavor tag entry includes one or more of the following pieces of information: flavor tag text 1440, yes vote count 1442, no vote count 1444, and a vote entry portion 1446. Vote entry portion 1446 provides an interface for a user to enter a vote on the flavor tag. Although FIG. 14 depicts the flavor tag display as separate page, the flavor tag display can be a window or similar interface on another page.

Flowchart 1300 begins at step 1310 when a request to access the flavor tag display page associated with item is received. As described above, the item display page (or another prediction system interface page) may include a link to the flavor tag display page associated with the item. A user activates the link using techniques well known in the computer arts.

In step 1320, an interface allowing flavor tag voting and flavor tag entry is provided.

In step 1330, a determination is made whether any action has been made by a user. If no action has been made, operation proceeds to step 1335. If an action has been made by the user, operation proceeds to step 1340.

In step 1335, the system waits for an action from the user.

In step 1340, a determination is made what action was selected by the user. If a vote action was selected, operation proceeds to step 1350. A vote action may include activation of a positive (e.g., agree) or negative (e.g., disagree) vote link, button, or similar mechanism. If an add flavor tag action was taken by the user, operation proceeds to step 1370. An add flavor tag action may include entering a statement and activating an enter/done/ok link, button, or similar mechanism. If a leave page action was taken, operation proceeds to step 1385 where processing of flowchart 1300 ends. A leave page action is any action which causes the user to move to a different page.

In step 1352, a determination is made whether a positive vote was received. If a positive vote was received, operation proceeds to step 1360. If a positive vote was not received, operation proceeds to step 1354. As would be appreciated by a person of skill in the art, step 1352 could also determine whether a negative vote was received.

In an embodiment, the prediction system includes a mechanism to restrict a user ID from voting on an individual flavor tag more than one time. This avoids attempts to artificially raise (or lower) the count associated with the flavor tag.

In step 1354, the negative vote count is incremented. Operation then returns to step 1335 where the system waits for an additional action from the user.

In step 1360, the positive vote count is incremented.

In step 1362, a determination is made whether the minimum number of positive votes has been received. If a minimum number of positive votes has been received, operation proceeds to step 1364. If a minimum number of positive votes have not been received, operation proceeds to step 1366.

In step 1364, the flavor tag is added to or kept in the set of flavor tags for display on the item display page.

In step 1366, the flavor tag is kept in the set of flavor tags for display on the flavor tag display page. Note that the set of flavor tags for display on the flavor tag display page includes the set of flavor tags for display on the item display page. Operation then returns to step 1335 where the system waits for an additional action from the user.

In step 1370, a new flavor tag is received.

In step 1372, the language in the flavor tag is reviewed to determine whether it meets the language standards for the prediction system. This step is optional. When present, step 1372 attempts to block posting of flavor tags having obscene or overly offensive language. For example, the system may analyze the language of the flavor tag against a commercially available "dirty word" dictionary. In an alternate embodiment, step 1372 redacts words in a posting deemed to be obscene or overly offensive.

In addition, a user may alert the administrator of objectionable content posted in a flavor tag, a subjective commentary, and/or any other user entered text. The alerting mechanism may be provided by a link or menu item on selected web pages. In addition or alternatively, a link to the e-mail address of the administrator may be provided. As would be appreciated by persons of skill in the art, other methods for contacting the administrator may be provided.

In step 1373, the flavor tags are parsed to determine whether the entered flavor tag is similar or identical to an existing tag. This step is optional. If the flavor tag is similar or identical to an existing tag, the flavor tags may be aggregated. Alternatively, the new flavor tag is rejected.

In step 1374, the new flavor tag is associated with the user ID of the user entering the tag. This step is optional. When present, the system may display the user ID with the flavor tag on a display page.

In step 1376, the new flavor tag is added to the set of flavor tags for display on the flavor tag display page. Operation then returns to step 1335 where the system waits for an additional action from the user.

In step 1385, flavor tag processing ends and the user is directed to a different page.

2.3.3 Method for Providing Subjective Commentary Supporting a Prediction

Figure 15:
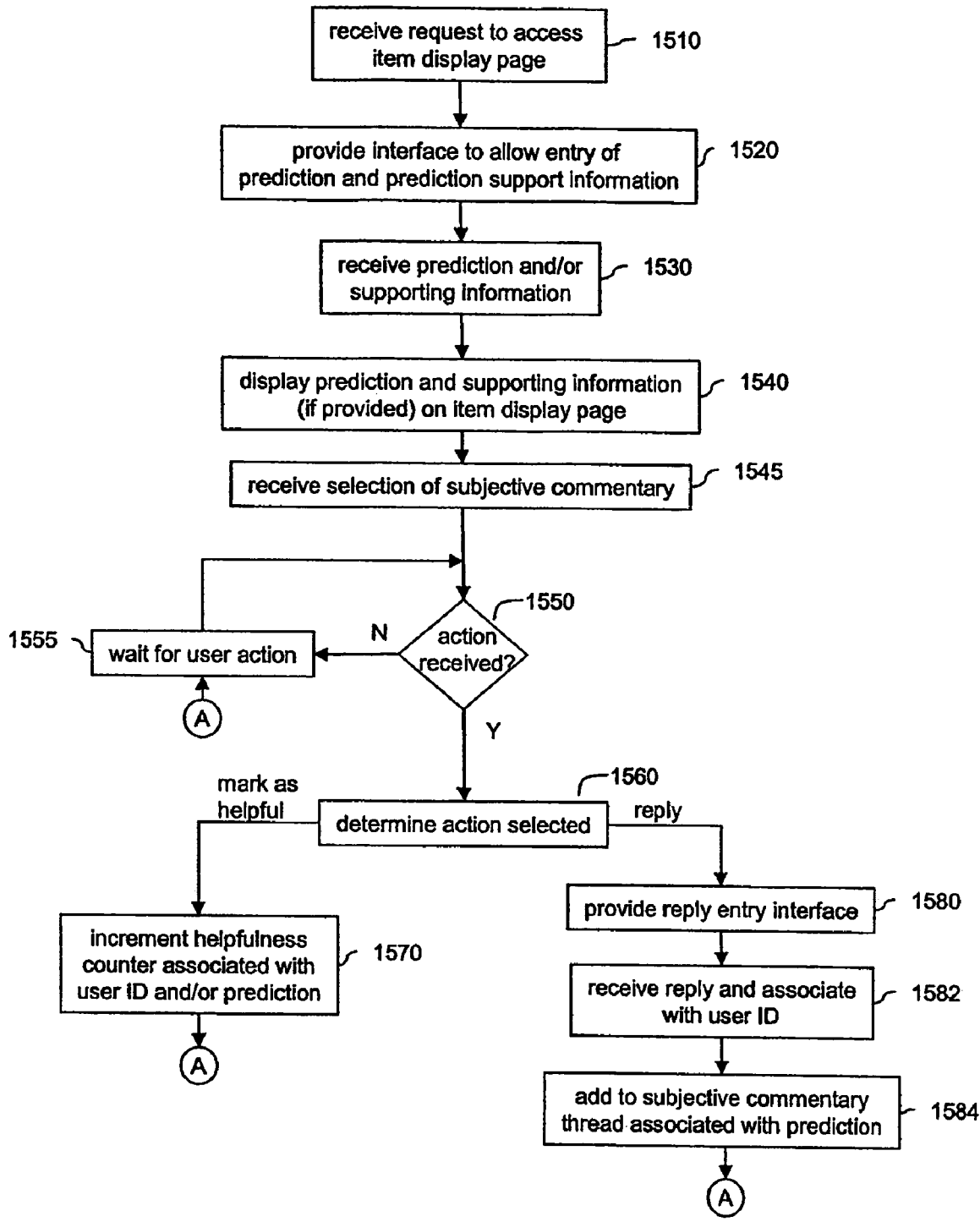
FIG. 15 depicts a flowchart of a method for providing subjective commentary supporting a prediction, according to an embodiment of the present invention.

FIG. 15 depicts a flowchart 1500 of a method for providing subjective commentary supporting a prediction, according to an embodiment of the present invention. Flowchart 1500 will be described with continued reference to the example system architecture 100 described with reference to FIG. 1. However, the invention is not limited to those embodiments. Note that some steps shown in flowchart 1500 do not necessarily have to occur in the order shown.

As described above in the discussion of step 325 of FIG. 3, a user can enter subjective information supporting a prediction being made. In the context of a contest, a prediction is referred to as a contest entry. The subjective information is additional commentary by the user to describe, justify, or explain the prediction. The information can be textual, audio, image, video, or a combination thereof.

Flowchart 1500 is divided into two groups of operations. Steps 1520-1540 are related to the addition of subjective commentary to support a prediction by the user making the prediction. Steps 1550-1586 are related to interaction by any user with the subjective commentary already entered.

Flowchart 1500 begins at step 1510 when a request to access the an item display page is received. The home page for the prediction system may include a mechanism for a user to access an item display page. For example, a user may enter the item's name in a provided entry field to access the item's display page. As can be seen in FIG. 5, an item display page 500 includes a prediction entry portion 520 and a prediction listing portion 530. The prediction entry portion 520 is only displayed if the user has not yet made a prediction for this item. The prediction listing portion 530 includes a listing of predictions made by users of the prediction system. The prediction listing entries 532 may be sorted by user ranking or proficiency. Each prediction listing entry 532 includes a user ID, prediction information, and a link to access subjective commentary, if entered.

In step 1520, an interface allowing entry of prediction information and supporting subjective commentary is provided.

In step 1530, prediction and prediction supporting information is received.

In step 1540, the prediction and prediction supporting information is associated with the user ID of the user entering the information and is displayed on the item display screen in the prediction listing.

In step 1545, a selection of a subjective commentary is received. For example, a subjective commentary may be selected by activating the link, button, or similar mechanism provided in the prediction listing. The selection causes a subjective commentary box to be displayed.

In step 1550, a determination is made whether any action has been made by a user. If no action has been made, operation proceeds to step 1555. If an action has been made by the user, operation proceeds to step 1560.

In step 1555, the system waits for an action from the user.

In step 1560, a determination is made what action was selected by the user. If a marking action was received, operation proceeds to step 1570. A marking action includes activating a marking link, button, or similar mechanism provided in the subjective commentary box. A marking link includes "mark as helpful." If a reply action was received, operation proceeds to step 1580. A reply action includes activating a reply link, button, or similar mechanism provided in the subjective commentary box.

In step 1570, a helpful commentary counter associated with the user and/or associated with the particular commentary are incremented. As described above, a user may be awarded a charm if a certain number of his comments are viewed as helpful. In addition or alternatively, achieving a value of a helpful commentary count may cause a gumball to be generated for the user. Operation then returns to step 1555 where the system waits for an additional action from the user.

In step 1580, a reply entry interface is provided to the user.

In step 1582, a reply is received from a user and associated with the user ID of the user entering the reply.

In step 1584, the reply is added to the discussion thread in the subjective commentary box associated with the prediction. Operation then returns to step 1555 where the system waits for an additional action from the user.

2.4 Method for Sorting Items

Figure 24:
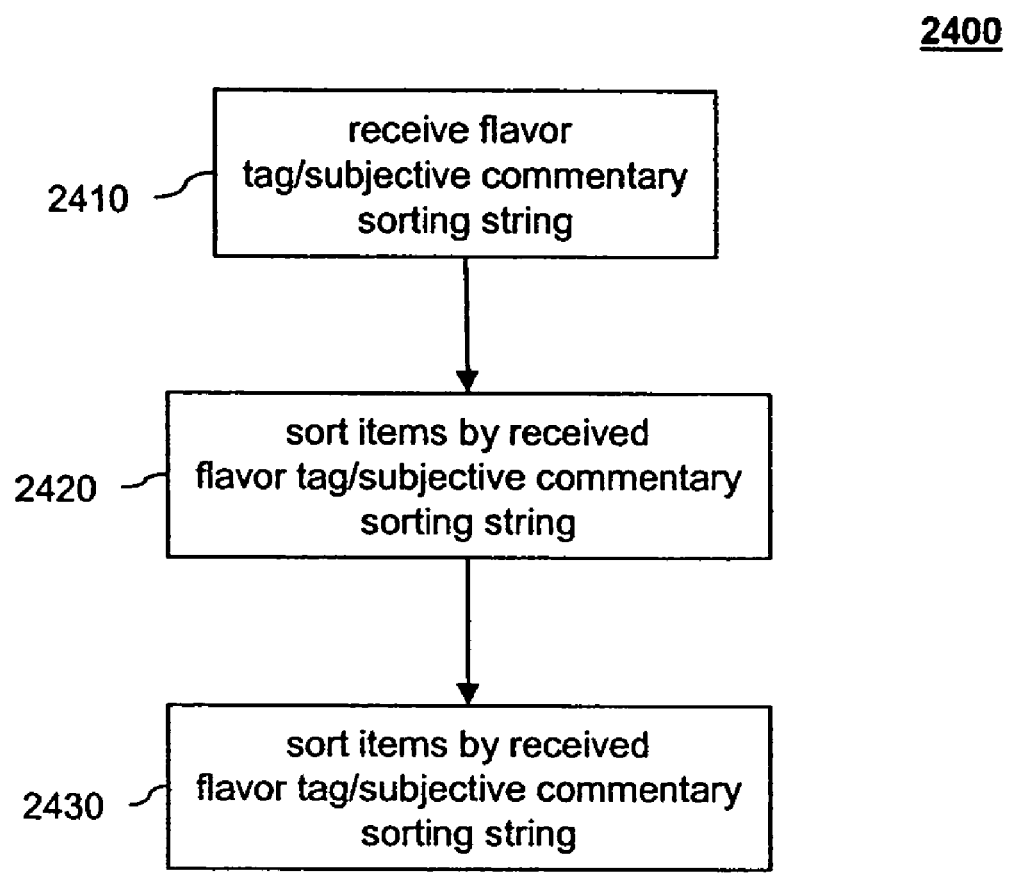
FIG. 24 depicts a flowchart of a method for sorting items based on flavor tags and/or subjective commentary subject matter, according to an embodiment of the present invention.

FIG. 24 depicts a flowchart 2400 of a method for sorting items according to flavor tag and/or subjective commentary subject matter, according to an embodiment of the present invention. Flowchart 2400 will be described with continued reference to the example system architecture 100 described with reference to FIG. 1. However, the invention is not limited to those embodiments. Note that some steps shown in flowchart 2400 do not necessarily have to occur in the order shown.

Sorting items by subject matter entered in a flavor tag or subjective comment allows a user to view items having similar characteristics and/or descriptions. For example, a user may want to view (and/or make predictions on) any stock labeled as a "cutting edge pharmaceutical stock" in an associated flavor tag.

Flowchart 2400 begins at step 2410 when a flavor tag and/or subject commentary sorting string is received. A sorting string may be received in a variety of ways. The prediction system may provide a text box (or similar entry mechanism) to allow a user to type in the sorting string. For example, the user may type "cutting edge pharmaceutical" into the text box and activate a sort by flavor tag and/or a sort by subjective comment device. Alternatively, a flavor tag may have an associated link (or similar mechanism) for activating sorting. In this alternative, the user would activate the "sort by" link to cause the system to sort items using the subject matter of the associated flavor tag as the sorting string.

In step 2420, items are sorted by flavor tag or subjective comment sorting string. For example, if the user entered "cutting edge pharmaceutical" and sort by flavor tag in step 2410, any item having that subject matter in an associated flavor tag would be identified as a member of the sorted set of items.

In step 2430, the items having the sorting string in an associated flavor tag and/or associated subjective comment (sorted set) are displayed to the user.

3. USER INTERACTION

3.1 Competition Among Users

As described herein, the prediction system provides a user with the ability to compete against one or more other users in the prediction of performance of items. A method for entering contest entries in a contest is described above in Section 2.2. The following section describes additional tools available to competitors in a contest.

A user accesses statistical and ranking information associated with one or more contests in a contest main page. The prediction system may provide one main page per contest. Alternatively, the system provider may provide one main page associated with all users of the system.

Figure 16:
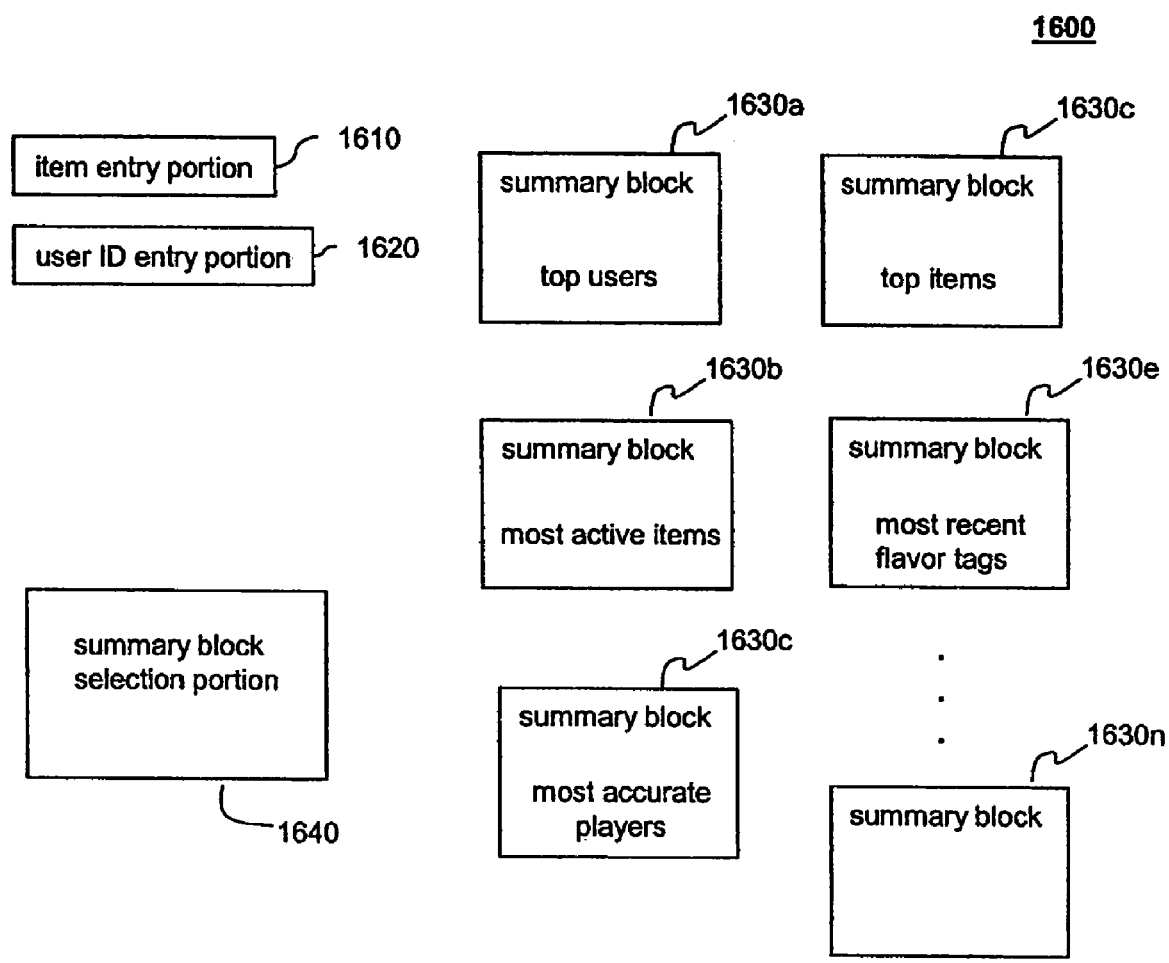
FIG. 16 depicts a block diagram of an exemplary main page, according to an embodiment of the present invention.

FIG. 16 depicts a block diagram of an exemplary main page 1600, according to an embodiment of the present invention. Exemplary main page 1600 includes an item entry portion 1610, a user ID entry portion 1620, a plurality of summary blocks 1630*a-n*, and a summary block selection portion 1640. Item entry portion 1610 provides an interface for entering an item to be predicted. When an item is entered into entry portion 1610, the user is directed to the display page for the item. User ID entry portion 1620 provides an interface for entering the user ID for another user of the prediction system. When a user ID is entered into user ID portion 1620, the user is directed to the display page for the entered user. In an embodiment, an additional fee or subscription charge is required to access another user's page.

Summary blocks 1630 provide summary of statistics and information related to a pending contest. FIG. 16 illustrates exemplary summary blocks such as a summary of the top users 1630*a*, a summary of the most active items 1630*b*, a summary of the most accurate users 1630*c*, a summary of the top items 1630*d*, and a summary of the most recently entered flavor tags 1630*e*. Additional summary blocks may be customized based on the domain of the contest. As would be appreciated by persons of skill in the art, other types of summaries can be provided with the present invention. Summary block selection portion 1640 provides the user with a mechanism for selecting which summary blocks are displayed on main page 1600.

Figure 17:
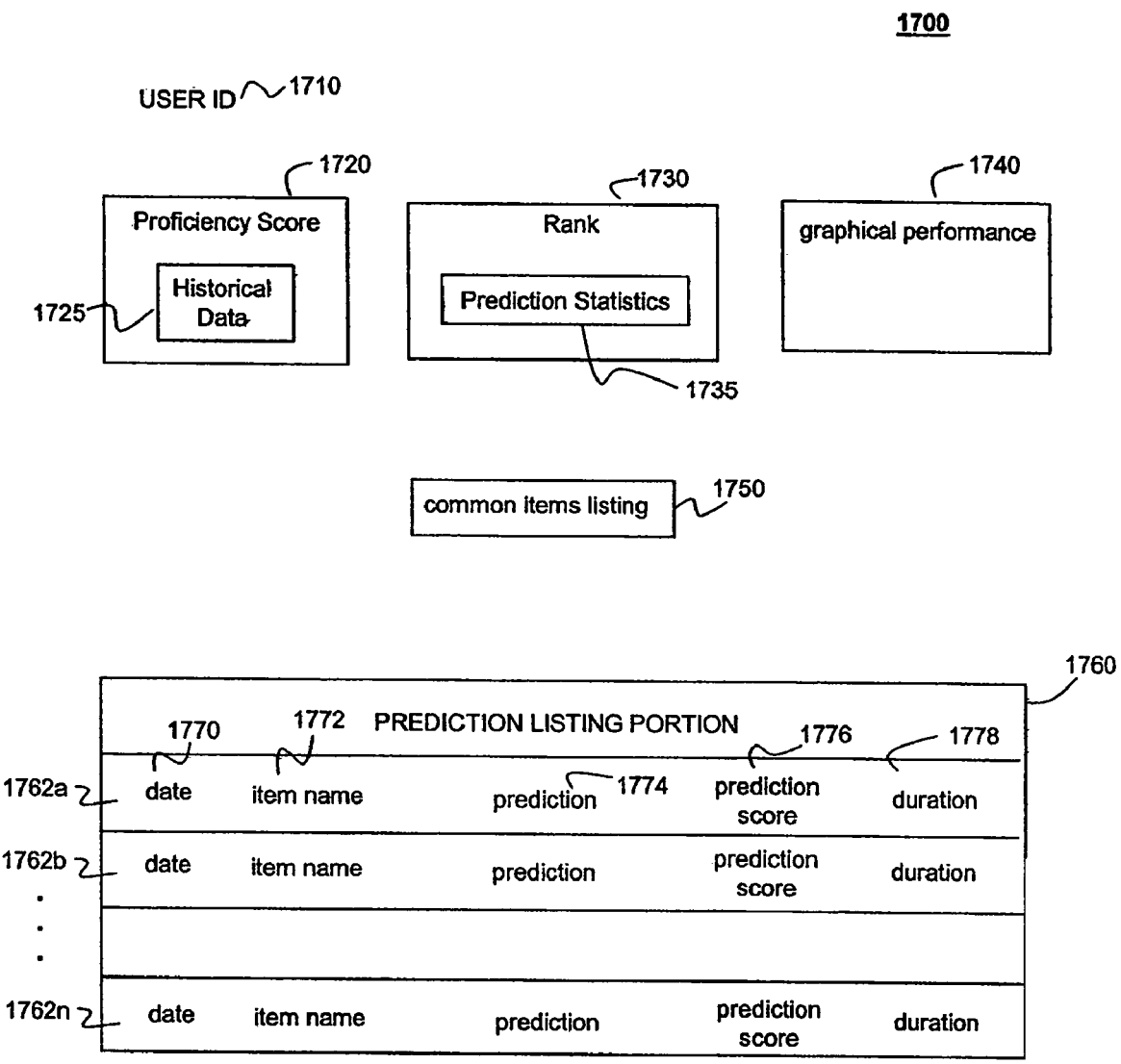
FIG. 17 depicts a block diagram of an exemplary user display page, according to an embodiment of the present invention.

A user accesses statistics regarding their performance and a summary of pending contest entries on his user display page. FIG. 17 depicts a block diagram of an exemplary user display page 1700, according to an embodiment of the present invention. Exemplary user display 1700 includes the user ID 1710, a proficiency score portion 1720, a rank portion 1730, a graphical performance portion 1740, a common items listing 1750, and a prediction listing portion 1760. Proficiency score portion 1720 provides the current proficiency score for the user and a historical data portion 1725. Historical data portion includes information related to the user's past performance. Rank portion 1730 provides the current rank of the user and a prediction statistics portion 1735. Prediction statistics portion 1735 provides summary information related to the user's predictions. For example, prediction statistics portion 1735 may list the user's highest and lowest prediction scores and the items which the user currently has the highest score of all users.

Graphical performance portion 1750 provides a graphical representation of the user's past performance. In an embodiment, the system provider analyzes the prediction data for the user over a predetermined period and develops a chart (or timeline) of the user's performance during that time period. Common items listing portion 1750 includes a list of items which the user associated with the page being viewed and the user accessing the page have in common. User display page 1700 also includes a prediction listing portion 1760. Prediction listing portion 1760 includes one or more prediction entries 1762a-n made by the user ID. Each entry includes one or more of the following pieces of information: date of the prediction 1770, item name 1772, the prediction 1774, the prediction score 1776, and the prediction duration 1778.

A user can also access the user display pages for other users in a competition. In an embodiment, the user accesses another user's page by entering the user's ID in a dialog box or by activating a link associated with the user's ID. In an embodiment, the prediction system provider charges a fee or subscription charge for accessing another user's pages. The fee or charge can be based on the accessee's proficiency or reputation. A higher fee may be paid for high performers. A low fee or no fee may be paid for other performers.

In an embodiment, a notification feature can be provided to a user. The user may specify event(s) of which he wishes to be notified. Notification may be in the form of e-mail, an icon on the user's display page, or a similar mechanism.

In an embodiment, the system administrator or contest administrator may provide prizes or awards to users based on their performance in the competition.

In an embodiment, users are provided with a screening tool. The screening tool enables users to access the databases of the prediction system provider to determine information about selected items. For example, in a stock prediction contest, a user may request information on companies satisfying certain performance thresholds (e.g., price to earning ratios). The system provider may charge a fee or subscription charge for using the screening tool.

3.2 Aid to Investing or Competing in a Contest

The prediction system may also be used as an aid to investing. In an embodiment, a prediction system may provide one or more universes related to predicting the performance of stocks. The intelligence gathered as a result of the objective predictions and subjective commentary entered by users is valuable for determining stock investment strategies for an individual. A variety of investment aids can be provided by the prediction system of the current investment. These investment aids are described in further detail below.

3.2.1 Prediction Information Associated with Individual Stocks

One investment aid is the presentation of prediction information associated with individual stocks. The system administrator may provide an individual with access to a display page associated with and individual stock (e.g., in the format of item display page depicted in FIG. 5). The individual may be registered user of the system (user) or system browser. Different types of information may be provided to the individual based on the individual's registration status.

As described above, the stock display page includes a listing of predictions made by users of the prediction system. Each entry in the prediction list includes a user ID, a proficiency score or rank of the user, the prediction information, and subjective commentary supporting the prediction, if entered. In addition, the stock display page includes a listing of subjective flavor tags associated with the stock and a listing of subjective commentary associated with the stock (and not directly associated with a specific prediction).

In an embodiment, the prediction list is order based on the proficiency of the user or based on the rank of the user making the prediction. Therefore, an individual can use the predictions made by top performers as a guide for making an investment in a stock. Furthermore, the individual can read the commentary associated with the stock or with a specific prediction. Because both the commentary and prediction are associated with a user ID and proficiency, the user can determine how much weight to give an individuals viewpoint.

Furthermore, each stock includes a community sentiment score. The community sentiment score provides valuable insight into how a community of users thinks a stock will perform.

In an embodiment, the administrator of the system may withhold the predictions and/or comments of high performing users from being displayed on an individual stock display page. An individual may be required to register with the system or pay an additional fee or subscription charge to view the predictions and/or comments of high performers. Additionally or alternatively, the administrator of the system may not post the predictions and/or comments of high performers for a predetermined period of time after a prediction is made.

3.2.2 Prediction Information Associated with Top Performers

Another investment aid is the ability to review prediction information associated with top performers. As described above in section 3.1, each user has an associated display page containing a listing of that user's predictions. The system provider may make the display pages of the top performers in the game available for a fee or subscription charge.

3.2.3 Reports

Another investment aid is the ability to request reports containing summaries of information gathered by the prediction system. For example, the system may provide a periodic report of the predictions of the top X performers for a fee or a subscription charge. In addition or alternatively, the system may provide a periodic report of the top-rated or lowest-rated stocks for a fee or a subscription charge.

In addition, the system provider may provide an analysis report customized for an individual user. The report may aid the user in investing and/or in one or more active contests. The report may include analysis of the user's strength and/or weaknesses during the reporting period. The report may also include information for making future predictions or items which may be of interest to the user.

In addition, the system provider may provide a report in other contexts aside from investing or competing in contests. These reports may provide information regarding patterns of users' behavior.

As would be appreciated by persons of skill in the art, other types of reports could be generated by the prediction system.

3.2.4 Pundit and/or Institution Ranking

Another investment aid is pundit and/or institution ranking. Industry pundits and institutions periodically make predictions related to the performance of one or more stocks. The prediction system of a present invention provides a mechanism for determining the proficiency of pundits and/or institutions in predicting the performance of stocks. Ranking provides an objective mechanism for an individual to assess the weight to give predictions made by a pundit and/or institution.

In an embodiment, an avatar or identity is created for a pundit and/or institution. The avatar is entered into the contest having the universe of all system users. An employee of the system provider or a third party partner then tracks predictions made by the pundit and/or institution and enters them as contest entries into the system. Individuals can then access the stock rating page associated with the avatar to determine the score of the individual contest entries and the ranking of the avatar against other users in the system.

In an additional or alternative embodiment, the prediction system provides an "accountability corner." In this embodiment, the pundits and/or institutions are not officially entered into a contest. Instead, the performance of pundits and/or institutions is tracked using a contest as a baseline. The "accountability corner" can be a publication or web site providing the score that a pundit and/or institution would have received for an individual pick and/or the proficiency and ranking the pundit and/or institution would have received in the contest. Some or all of the tracking functionality described above may be offered to users for free, on a subscription bases, or on a fee-per-use basis.

3.2.5 Tracking Proficiency of Professionals

Another investment aid is tracking the proficiency of professionals. Many individuals enlist the aid of a broker or a money manager in the selection of investment vehicles. A brokerage or management firm may enter one or more of its employees into a stock prediction contest to track their proficiency.

The objective proficiency and ranking of the employees can then be used by the corporation as a marketing tool or as an input to determine the rate to charge for the services of an employee. In addition, the corporation can make the proficiency and/or rankings of its employees available to customers. Customers can use this information when deciding which employee to use to represent their financial interests.

In an embodiment, a user establishes a reputation in the prediction system through contests and possibly through ancillary content provided by the user (as described in Section 3.3.2 below). The user can use this reputation as a sales tool or as an employment tool.

3.2.6 Portfolio Tracking

In an embodiment, a user can use the prediction system to track the performance of their stock portfolio. In this embodiment, the user or brokerage populates the prediction system with stocks included in their portfolio. Each stock then becomes an individual prediction associated with the user. As described above, the individual display page associated with the user lists all the pending predictions of the user. In this way, the user can view the performance of each stock in his portfolio on a single page.

The prediction system provider may partner with a brokerage to provide this service to the customers of the brokerage. Alternatively, the prediction system provider may offer this service as a stand-alone product.

3.3 Creation of Ancillary Content 3.3.1 Publications

One type of ancillary content that can be offered by the provider of a prediction system is a publication such as a newsletter. Publications can be offered to help a user improve her performance in a specific contest and/or as an aid to investment. Publications could be targeted to a community of users (referred to herein as generic publications) or to a specific user (referred to herein as targeted publications).

Generic publications could be generated to cover all topic areas and/or may cover a specific area. For example, in the stock market context, a generic publication could cover all potential stocks traded on the S&P 500. Additionally or alternatively, a generic publication could cover a specific industry segment (e.g., tech stocks).

The content of a generic publication could summarize recent predictions by top performers in a contest. In addition or alternatively, the content of a generic publication could summarize the user sentiment scores of particular items.

Targeted publications are customized for a specific user. The content of a targeted publication can be based on intelligence about the user gathered by the prediction system. For example, the prediction system may determine that the user has recently been making predictions in a certain area. The prediction system may then generate a publication including tips and advice for making predictions in that area.

In addition or alternatively, the content of a targeted publication can be requested by a specific user. For example, a user may request a publication be generated including predictions of top performers in a specific area or summaries of community sentiment scores for items in the requested area.

3.3.2 Ancillary Content Provided by Top Performers

Other types of ancillary content can be provided by top performers. A prediction system provider may identify one or more consistently high performers in a contest. The system provider may then partner with these top performers to offer content to users. Examples of content which can be provided by a top performer are described below.

In an embodiment, a top performer provides a blog to discuss items being predicted on the system. A blog is a collection of information that is instantly posted to a web site. The prediction system provider may offer the web site for the top performer to host his blog. Alternatively, the top performer may offer access to the blog separately from the system provider. The system provider may require a fee or subscription charge to access the top performer blog sites. A portion of the fee or subscription charge may be shared with the top performer.

Alternatively or additionally, a top performer hosts a discussion board. A discussion board is generally a discussion thread forum which allows visitors to the board to view and/or post messages. The discussion board provides the top performer with a forum for sharing his thoughts on a variety of topics. The prediction system provider may offer a web site for the top performed to host her message board. Alternatively, the top performer may host her message board on a site not associated with the system provider. The system provider may require a fee or subscription charge to access the top performer discussion boards. A portion of the fee or subscription charge may be shared with the top performer.

Alternatively or additionally, a top performer generates a publication (such as a newsletter) for the prediction system provider. The publication is generated periodically (e.g., daily, weekly, or monthly). The topics to be covered in the publication may be selected by the prediction system provider, the top performer, or jointly. The user may require a fee or subscription charge to receive the publication of the top performer. A portion of the fee or subscription charge may be shared with the top performer.

In addition, the top performers may be offered employment by the system provider as writers for system provider columns, publications or as money managers.

3.3.3 Algorithm-Based Financial Products

In an embodiment, algorithm-based financial products are based upon the community sentiment scores of stocks. In an example, one or more sentiment based mutual funds are established. In a further embodiment, one or more hedge funds based on intelligence gathered by the prediction system are offered. The provider of the prediction system may partner with an investment group to manage these financial products. Alternatively, the prediction system provider may manage these products directly.

3.4 Individual Corporate Use

An individual corporation may use intelligence gathered by the prediction system in a variety of contexts. As described above, in an embodiment, a community of users can enter predictions and/or subjective commentary for a specific corporate stock. A corporation may use the community sentiment score for investor relations, marketing, or sales. For example, the community sentiment score for a stock may be 90%. This score represents that fact that 90% of the community believe the stock will outperform a market. A corporation may include this information in investor newsletters or marketing materials.

4. EXAMPLE USER INTERFACE SCREEN SHOTS

Various example screen shots related to the functionality of the invention are considered in this section. It is noted that these screen shots are provided for illustrative purposes only, and are not limiting. Additional screen shots will be apparent to persons skilled in the relevant art(s).

These screen shots are generated by the user interfaces of the invention, such as user interface 164 of device 160. However, other modules of the invention may also contribute to the user interface function with regard to their respective functionalities and responsibilities.

Generally, screen shots are generated to enable interaction with users. For example, screen shots may be generated to provide information to users, or to obtain information from users. Other users of screen shots will be apparent to persons skilled in the relevant art(s).

The screen shots in FIGS. 18-23 depict functionality of embodiments of the invention. The invention is directed to such functionality.

Figure 18:
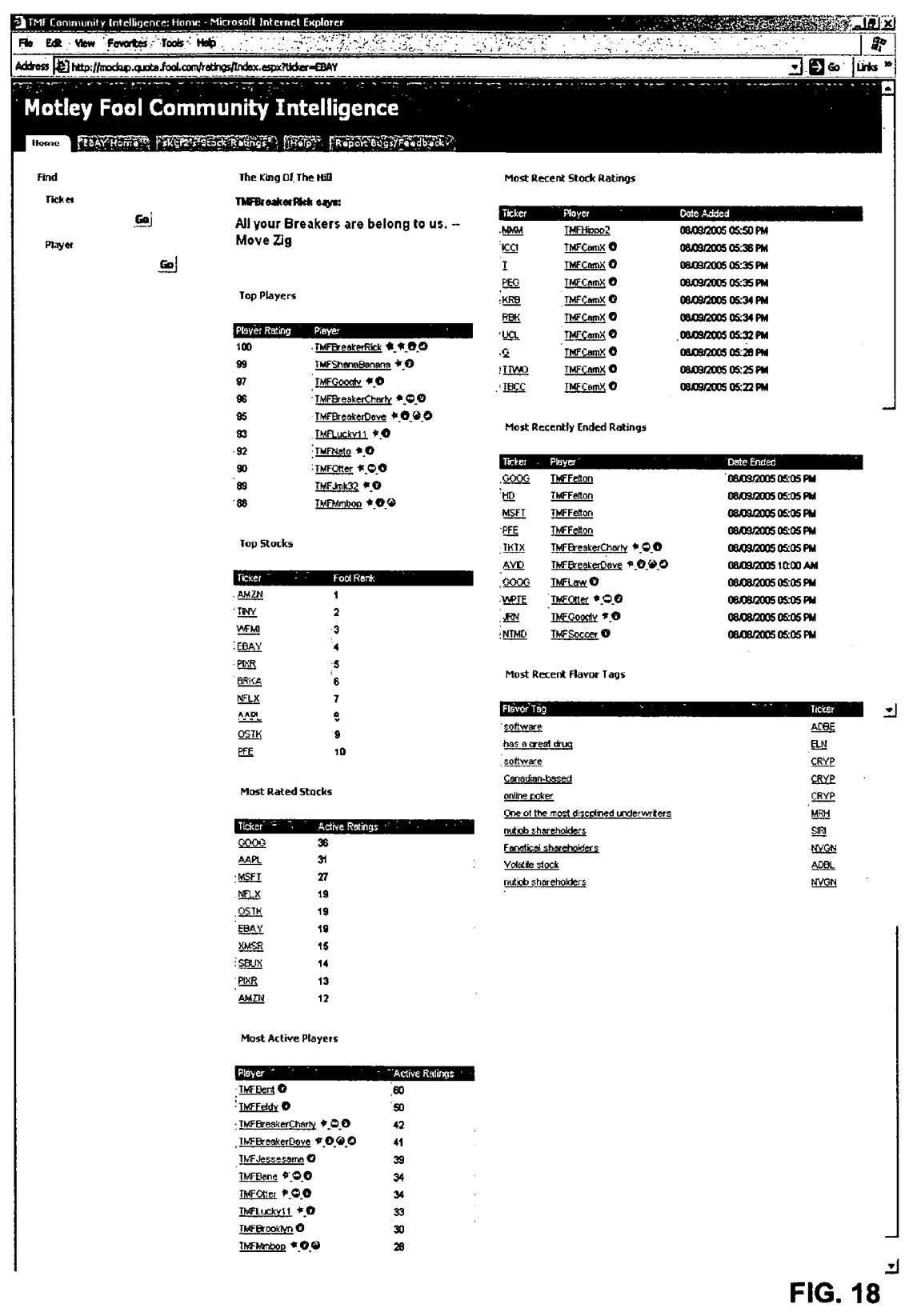

FIG. 18 is an example community intelligence screen shot displayed on client 168. In this screen, a user can access information related to one or more communities of the prediction system.

Figure 19:
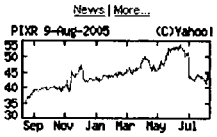
FIG. 19 is an example individual item prediction page screen shot displayed on a client, according to embodiments of the present invention.

FIG. 19 is an example individual item prediction page displayed on client 168. In this screen, a user can make a prediction associated with an item.

Figure 20:
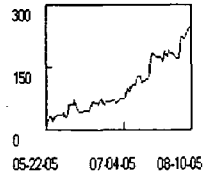
FIG. 20 is an example user page displayed on a client, according to embodiments of the present invention.

FIG. 20 is an example user page displayed on client 168. In this screen, a user can access information related to the contest entries associated with the user and the user's proficiency and contest entry performance.

Figure 21:
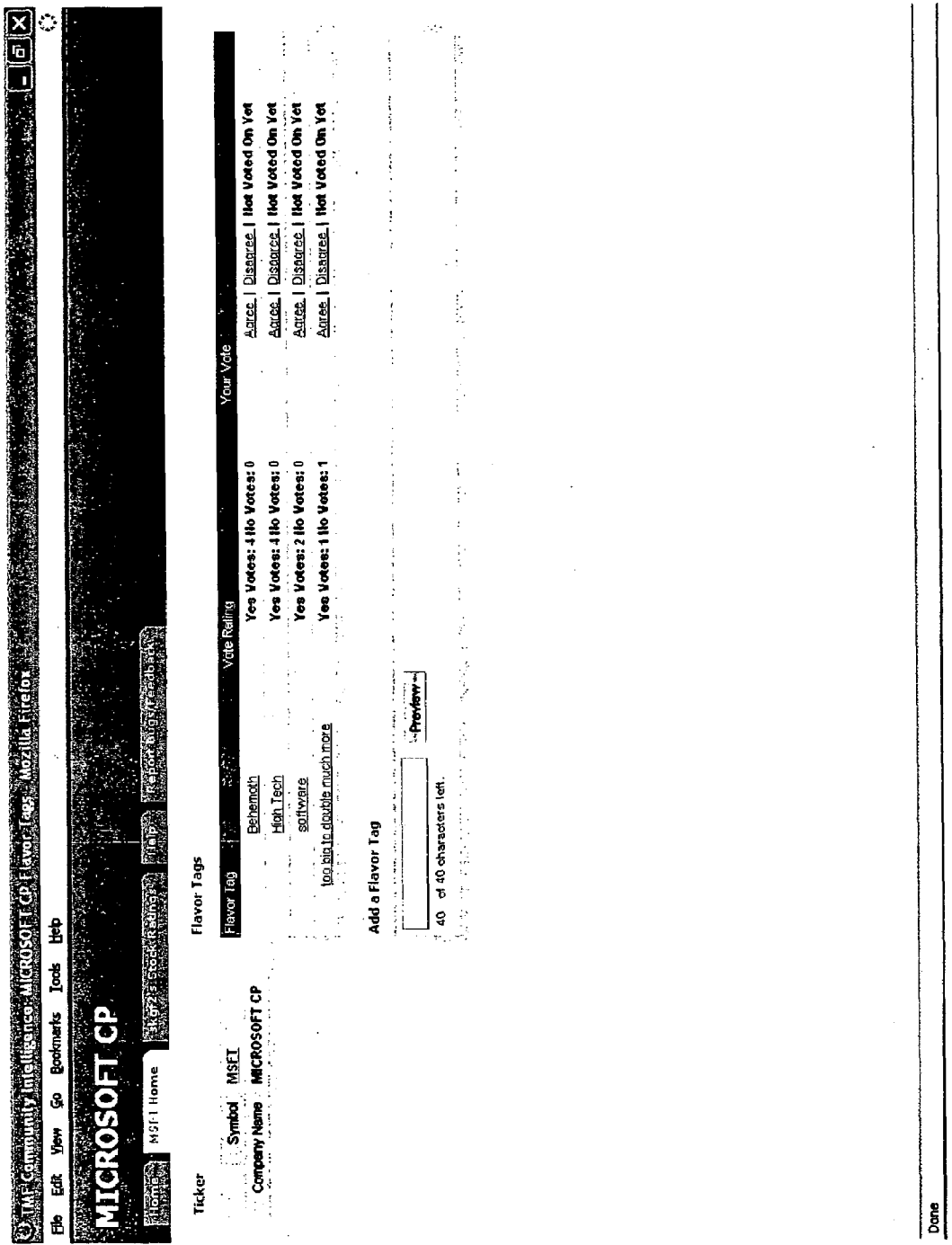
FIG. 21 is an example of a flavor tag page displayed on a client, according to embodiments of the present invention.

FIG. 21 is an example of a flavor tag page displayed on client 168. In this screen, a user can enter flavor tags and vote on flavor tags already entered for a particular item.

Figure 22:
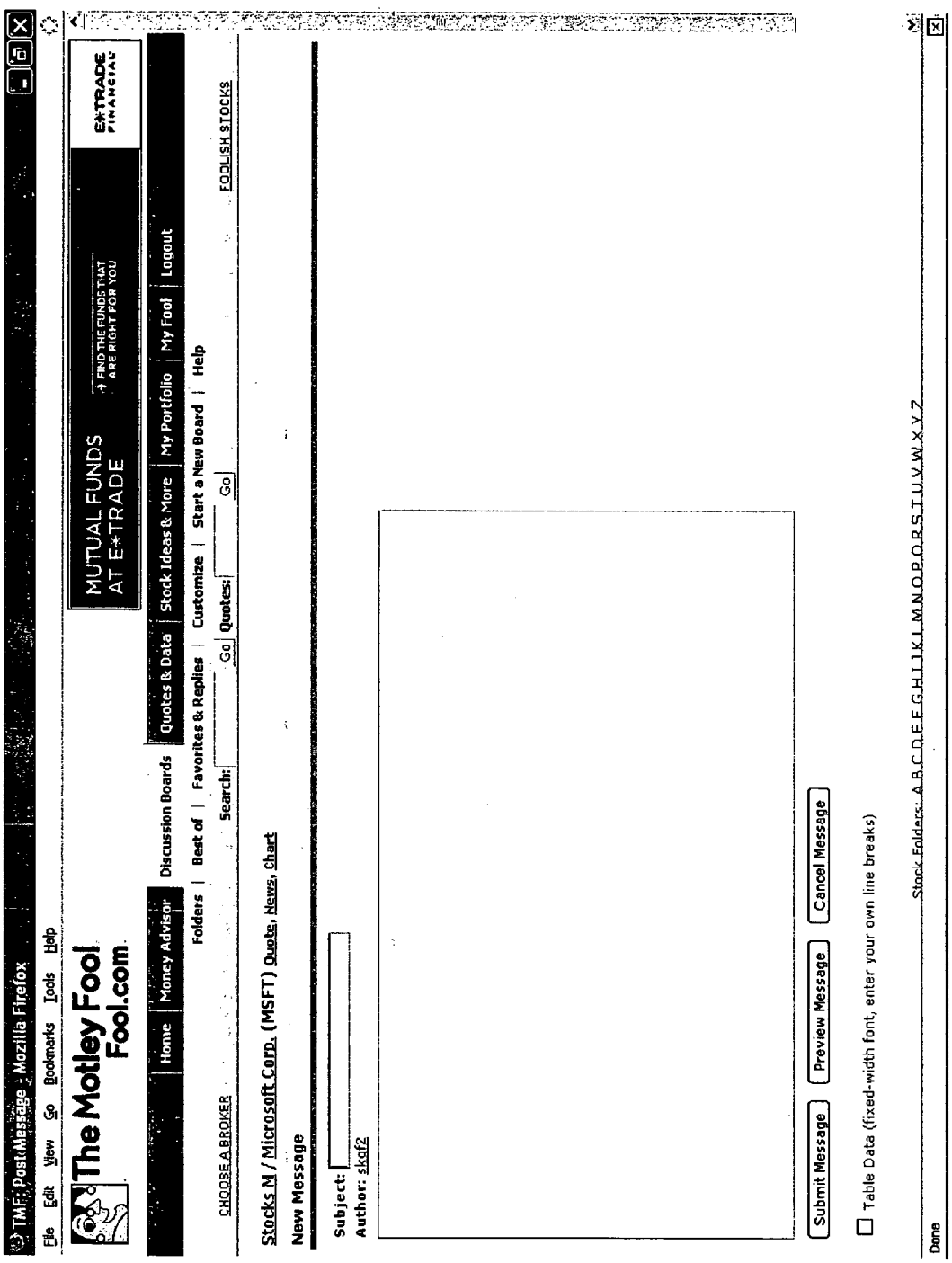
FIG. 22 is an example of a subjective commentary page associated with an item displayed on a client, according to embodiments of the present invention.

FIG. 22 is an example of a subjective commentary page associated with an item displayed on client 168. In this screen, a user can enter subjective commentary on the item.

FIG. 23 is an example of a subjective commentary interface associated with the prediction for an item displayed on client 168. In this screen, a user can enter subjective commentary or a reply to entered commentary on a specific prediction associated with the item.

5. CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A method for determining a proficiency of a first predictor, wherein the first predictor is a member of a contest having a plurality of additional predictors, comprising:
   (a) receiving a plurality of predictions from the first predictor, at a computing device, wherein a prediction is associated with a financial asset;
   (b) for each prediction, calculating a prediction score, at the computing device, wherein the prediction score is a measure of the prediction against an objective baseline for the prediction;
   (c) calculating a proficiency score for the first predictor, at the computing device, based on a set of prediction scores calculated in step (b), wherein step (c) includes:
      (i) calculating a total score component for the first predictor, at the computing device, wherein the total score component is a summation of the set of prediction scores calculated in step (b),
      (ii) calculating an accuracy component for the first predictor, at the computing device, wherein the accuracy component is based at least in part on a number of predictions the first predictor determined correctly and a total number of predictions made by the first predictor, and
      (iii) generating the proficiency score for the first predictor, at the computing device, wherein the proficiency score is a sum of the total score component and the accuracy component; and
   (d) upon occurrence of a predetermined event in the contest, automatically providing an informational message to the first predictor, at the computing device, wherein step (d) includes:
      (i) initiating a generation of the informational message, at the computing device,
      (ii) identifying a business segment associated with a set of prior predictions made by the first predictor, at the computing device,
      (iii) customizing a content of the informational message based on the identified business segment, at the computing device, wherein the content of the informational message includes investment advice related to one or more financial assets in the business segment and wherein the investment advice is generated independently of predictions made by the first predictor and by the plurality of additional predictors, and
      (iv) providing the informational message, at the computing device, to the first predictor via a display.

2. The method of claim 1, wherein the initiation of generation of the informational message is the receipt of a request for the informational message from the first predictor.

3. The method of claim 1, wherein the initiation of generation of the informational message is the occurrence of a message generation event.

4. The method of claim 1, wherein the initiation of generation of the informational message is the receipt from a third party of a request for the informational message for the first predictor.

5. The method of claim 1, wherein the content of the informational message includes an offer, wherein the offer is based at least in part on a prediction made by the first predictor.

6. The method of claim 1, further comprising:
(e) providing advertising to the first predictor, wherein content of the advertising is based at least in part on one of the plurality of predictions made by the first predictor.

7. A computer program product comprising a computer useable medium including control logic stored therein, the control logic enabling a determination of a proficiency of a first predictor, wherein the first predictor is a member of a contest having a plurality of additional predictors, the control logic comprising:
receiving means for enabling a processor to receive a plurality of predictions from the first predictor, at a computing device, wherein a prediction is associated with a financial asset;
first calculating means for enabling the processor to calculate, at the computing device, a prediction score for each prediction, wherein the prediction score is a measure of the prediction against an objective baseline for the prediction;
second calculating means for enabling the processor to calculate, at the computing device, a proficiency score for the first predictor based on a set of prediction scores calculated by the first calculating means, wherein the second calculating means includes:
third calculating means for enabling the processor to calculate, at the computing device, a total score component for the first predictor, wherein the total score component is a summation of the set of prediction scores calculated by the first calculation means,
fourth calculating means for enabling the processor to calculate, at the computing device, an accuracy component for the first predictor, wherein the accuracy component is based at least in part on a number of predictions the first predictor determined correctly and a total number of predictions made by the first predictor, and
generation means for enabling the processor to generate the proficiency score for the first predictor, at the computing device, wherein the proficiency score is a sum of the total score component and the accuracy component; and
informational message means for enabling the processor to provide an informational message to the first predictor, at the computing device, wherein the informational message means includes:
means for enabling the processor to automatically initiate a generation of the informational message, at the computing device, upon occurrence of a predetermined event in the contest,
means for enabling the processor to identify a business segment, at the computing device, associated with a set of predictions made by the first predictor,
means for enabling the processor to customize content of the informational message based on the identified business segment, at the computing device, wherein the content of the informational message includes investment advice related to one or more financial assets in the business segment, and wherein the investment advice is generated independently of predictions made by the first predictor and by the plurality of additional predictors, and
means for enabling the processor to provide, at the computing device, the informational message to the first predictor via a display.

8. The computer program product of claim 7, the control logic further comprising:
means for enabling the processor to provide advertising to the first predictor, wherein content of the advertising is based at least in part on one of the plurality of predictions made by the first predictor.

* * * * *